(12) United States Patent
Xue et al.

(10) Patent No.: US 10,558,208 B2
(45) Date of Patent: Feb. 11, 2020

(54) METHODS AND APPARATUS FOR PREDICTING FAVORED WIRELESS SERVICE AREAS FOR DRONES

(71) Applicant: Intel Corporation, Santa Clara, CA (US)

(72) Inventors: Feng Xue, Redwood City, CA (US); Nageen Himayat, Fremont, CA (US); Venkatesan Nallampatti Ekambaram, Hillsboro, OR (US); Shilpa Talwar, Cupertino, CA (US); Sai Qian Zhang, Cambridge, MA (US)

(73) Assignee: INTEL CORPORATION, Santa Clara, CA (US)

( * ) Notice: Subject to any disclaimer, the term of this patent is extended or adjusted under 35 U.S.C. 154(b) by 229 days.

(21) Appl. No.: 15/850,783

(22) Filed: Dec. 21, 2017

(65) Prior Publication Data

US 2019/0049943 A1 Feb. 14, 2019

(51) Int. Cl.
| | |
|---|---|
| *G05D 1/00* | (2006.01) |
| *B64C 39/02* | (2006.01) |
| *G08G 5/00* | (2006.01) |
| *H04W 24/02* | (2009.01) |
| *H04W 16/18* | (2009.01) |
| *H04W 84/06* | (2009.01) |

(52) U.S. Cl.
CPC .......... *G05D 1/0022* (2013.01); *B64C 39/024* (2013.01); *G08G 5/0069* (2013.01); *H04W 16/18* (2013.01); *H04W 24/02* (2013.01); *B64C 2201/146* (2013.01); *H04W 84/06* (2013.01)

(58) Field of Classification Search
None
See application file for complete search history.

(56) References Cited

U.S. PATENT DOCUMENTS

| | | | |
|---|---|---|---|
| 9,668,146 B2 * | 5/2017 | Lau | ........................ H04W 16/20 |
| 2015/0063202 A1 * | 3/2015 | Mazzarella | ............. H04W 4/90 370/316 |

* cited by examiner

*Primary Examiner* — Lail A Kleinman
(74) *Attorney, Agent, or Firm* — Hanley, Flight & Zimmerman, LLC

(57) ABSTRACT

Methods and apparatus for predicting favored wireless service areas for drones are disclosed. A controller for a drone includes a service area identifier to identify favored wireless service areas during a flight of the drone. The favored wireless service areas are predicted by a model developed remotely from the drone. The controller also includes a service area selector to select one of the favored wireless service areas during the flight. The controller also includes a route manager to adjust a flight path of the drone during the flight based on the selected one of the favored wireless service areas.

20 Claims, 11 Drawing Sheets

METHODS AND APPARATUS FOR PREDICTING FAVORED WIRELESS SERVICE AREAS FOR DRONES

FIELD OF THE DISCLOSURE

This disclosure relates generally to methods and apparatus for determining favored wireless service areas and, more specifically, to methods and apparatus for predicting favored wireless service areas for drones.

BACKGROUND

A drone traveling through an airspace during a flight may exchange control data (e.g., data associated with control of the flight operations and/or the route of the drone) with a ground controller via one or more cell(s) of one or more cellular base station(s) located within the airspace. Failure to maintain a communication channel between the drone and the ground controller via the cell(s) of the cellular base station(s) may lead to a lapse of control and/or a complete loss of control over the flight operations and/or the route of the drone.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

DETAILED DESCRIPTION

As used herein, a "wireless service area" is defined to be a geographic area in which a drone is able to wirelessly access a network. A wireless service area can be a cell serviced by a base station in a wireless communication system, and/or an area serviced by a wireless access point operating under any past, present or future wireless communication protocol such as Wi-Fi. As used herein, a "favored wireless service area" is defined to be a wireless service area (as defined above) which is more likely (relative to one or more other wireless service areas available to a drone) to maintain a communication channel between a drone in the wireless service area and a remote controller of the drone. The remote controller may be, for example, a ground based device.

Figure 1:
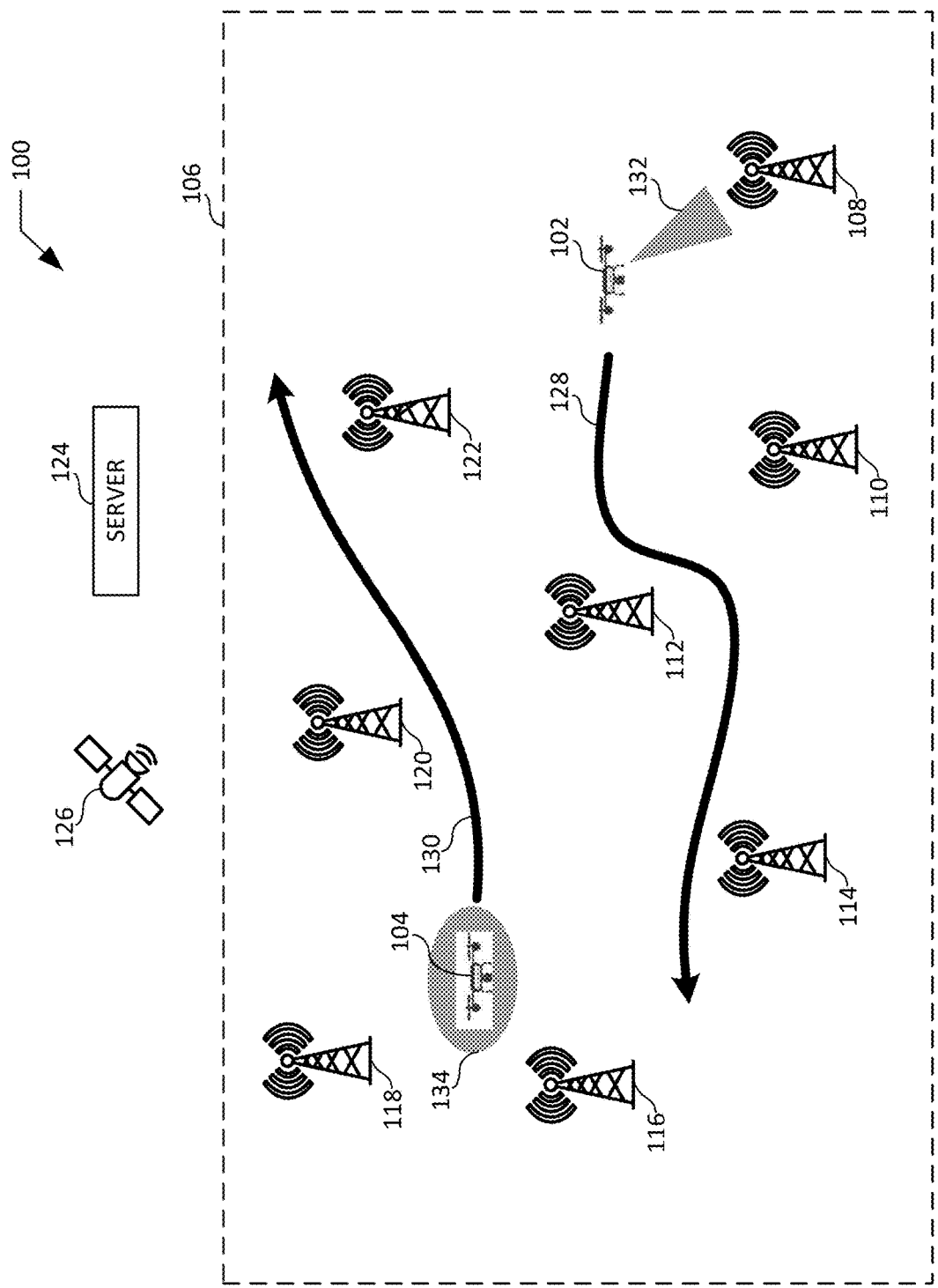
FIG. 1 illustrates a known environment of use in which a drone traveling through an airspace attempts to adjust its route based on locations of favored wireless service areas determined in real time during flight of the drone.

Known methods and/or processes exist for selecting a flight path of a drone in real time so as to traverse one or more favored wireless service area(s) during flight of the drone. FIG. 1 illustrates a known environment of use 100 in which a drone traveling through an airspace attempts to adjust its route based on locations of favored wireless service areas determined in real time during flight of the drone. The environment of use 100 of FIG. 1 includes a first drone 102 and a second drone 104. The first drone 102 and the second drone 104 of FIG. 1 are respectively shown traveling through an airspace 106 of the environment of use 100.

The airspace 106 of FIG. 1 includes a first cellular base station 108, a second cellular base station 110, a third cellular base station 112, a fourth cellular base station 114, a fifth cellular base station 116, a sixth cellular base station 118, a seventh cellular base station 120, and an eighth cellular base station 122. Respective ones of the cellular base stations 108, 110, 112, 114, 116, 118, 120, 122 of FIG. 1 service associated cell(s). Each cell has the potential to provide a communication channel between a drone (e.g., the first drone 102, the second drone 104, etc.) traveling within its corresponding area of the airspace 106 of FIG. 1 and a server 124.

The server 124 of FIG. 1 is located remotely from the airspace 106. The server 124 implements, is operatively coupled to, and/or is in communication with a ground controller capable of exchanging control data with a drone (e.g., the first drone 102, the second drone 104, etc.) traveling within the airspace 106. Control data associated with the ground controller may be exchanged between the server 124 and the drone via one or more communication channel(s) associated with one or more of the cellular base station(s) 108, 110, 112, 114, 116, 118, 120, 122 located within the airspace 106. Failure to maintain a communication channel for exchanging the control data between the server 124 and the drone may lead to a temporary and/or a complete loss of control over the flight operations and/or the route of the drone.

The first drone 102 and the second drone 104 of FIG. 1 respectively include a GPS receiver to collect and/or receive location data determined via GPS satellites 126. Location data collected and/or received via respective ones of the GPS receivers enables the corresponding respective drone (e.g., the first drone 102 or the second drone 104) to determine, detect, and/or identify its location within the airspace 106.

Routes and/or travel paths of the drones traveling within the airspace 106 may be based on such location data, and may further be based on destination data known to and/or communicated to the drones. For example, the first drone 102 may travel along the first route 128 within the airspace 106 based on location data collected by the GPS receiver of the first drone 102, and further based on destination data known to and/or communicated to the first drone 102. The second drone 104 may travel along the second route 130 within the airspace 106 based on location data collected by the GPS receiver of the second drone 104, and further based on destination data known to and/or communicated to the second drone 104.

The first drone 102 of FIG. 1 includes a directional antenna having an associated directional communication beam 132 that may be steered and/or positioned in a desired direction. During flight, the first drone 102 may steer the directional communication beam 132 in a multitude of different directions (e.g., sweeping the directional communication beam across a full angular domain of 360 degrees) to measure and/or obtain one or more reference signal strength(s) associated with one or more of the cellular base station(s) 108, 110, 112, 114, 116, 118, 120, 122 located within the airspace 106. Based on the measured and/or obtained reference signal strength(s), the first drone 102 may determine which cellular base station(s) 108, 110, 112, 114, 116, 118, 120, 122 provide(s) the strongest communication channel(s)). The first drone 102 may then attempt to adjust its position and/or its direction of travel relative to the first route 128 of FIG. 1 to steer the directional communication beam 132 of the first drone 102 toward the cellular base station(s) 108, 110, 112, 114, 116, 118, 120, 122 providing the strongest communication channel(s) (e.g., to traverse the corresponding favored wireless service area(s)), thereby improving the likelihood that the first drone 102 will maintain a communication channel with the server 124.

The second drone 104 of FIG. 1 includes an omnidirectional antenna having an associated omnidirectional communication beam 134 that radiates uniformly in all directions within a plane of the airspace 106. During flight, the second drone 104 may implement the omnidirectional communication beam 134 to measure and/or obtain one or more reference signal strength(s) associated with one or more of the cellular base station(s) 108, 110, 112, 114, 116, 118, 120, 122 located within the airspace 106. Based on the measured and/or obtained reference signal strength(s), the second drone 104 may determine which cellular base station(s) 108, 110, 112, 114, 116, 118, 120, 122 provide(s) the strongest communication channel(s)). The second drone 104 may then attempt to adjust its position and/or its direction of travel relative to the second route 130 of FIG. 1 to move the omnidirectional communication beam 134 and/or, more generally, the second drone 104 closer to the cellular base station(s) 108, 110, 112, 114, 116, 118, 120, 122 providing the strongest communication channel(s) (e.g., to traverse the corresponding favored wireless service area(s)), thereby improving the likelihood that the second drone 104 will maintain a communication channel with the server 124.

The known method and/or process described above in connection with FIG. 1 has several shortcomings. For example, in instances where the first drone 102 is traveling at a significant rate (e.g., a high rate) of speed, the first drone 102 may be unable to steer the directional communication beam 132 in the desired multitude of different directions (e.g., a full sweep of a 360 degree angular domain) in real time. The first drone 102 may accordingly be unable to sufficiently and/or completely measure and/or obtain the desired reference signal strength(s) associated with the cellular base station(s) 108, 110, 112, 114, 116, 118, 120, 122 in real time during flight. Determining which cellular base station(s) 108, 110, 112, 114, 116, 118, 120, 122 provide(s) the strongest reference signal strength(s) and/or the strongest communication channel(s) may likewise prove to be a difficult processing task for the first drone 102 to perform in real time during a high-speed flight.

An additional shortcoming of the known method and/or process described above in connection with FIG. 1 lies in the fact that the omnidirectional communication beam 134 and/or the omnidirectional antenna of the second drone 104 may encounter significant interference and/or noise which obscures and/or hinders the task of measuring and/or obtaining the reference signal strength(s) associated with the cellular base station(s) 108, 110, 112, 114, 116, 118, 120, 122 in real time during flight. For example, interference and/or noise encountered by the omnidirectional communication beam 134 and/or the omnidirectional antenna of the second drone 104 may negatively impact the accuracy of reference signal strength(s) that may be measured and/or obtained. In some instances, the negative impact of the interference and/or noise may be severe enough to render the data corresponding to the measured and/or obtained reference signal strength(s) useless for the purpose of determining and/or identifying the strongest reference signal strength(s) and/or the strongest communication channel(s) for the second drone 104 in real time during flight.

Methods and apparatus disclosed herein overcome these shortcomings by predicting favored wireless service areas for drones. Unlike the known methods and/or processes for determining favored wireless service areas described above in connection with FIG. 1, example methods and apparatus disclosed herein implement a model (e.g., a model developed offline by a server) to predict favored wireless service areas for a drone traveling within an airspace. The model may be transmitted and/or uploaded to the drone prior to the drone entering the airspace or, alternatively, while the drone is traveling within the airspace. The drone advantageously utilizes the favored wireless service areas identified by the model to make, and/or to determine the need for, adjustments to the position or a route of the drone in real time during a flight of the drone, and without the drone having to consume time and/or processing resources that would otherwise be associated with measuring, obtaining, and/or evaluating reference signal strength data associated with the airspace in real time during flight.

Figure 2:
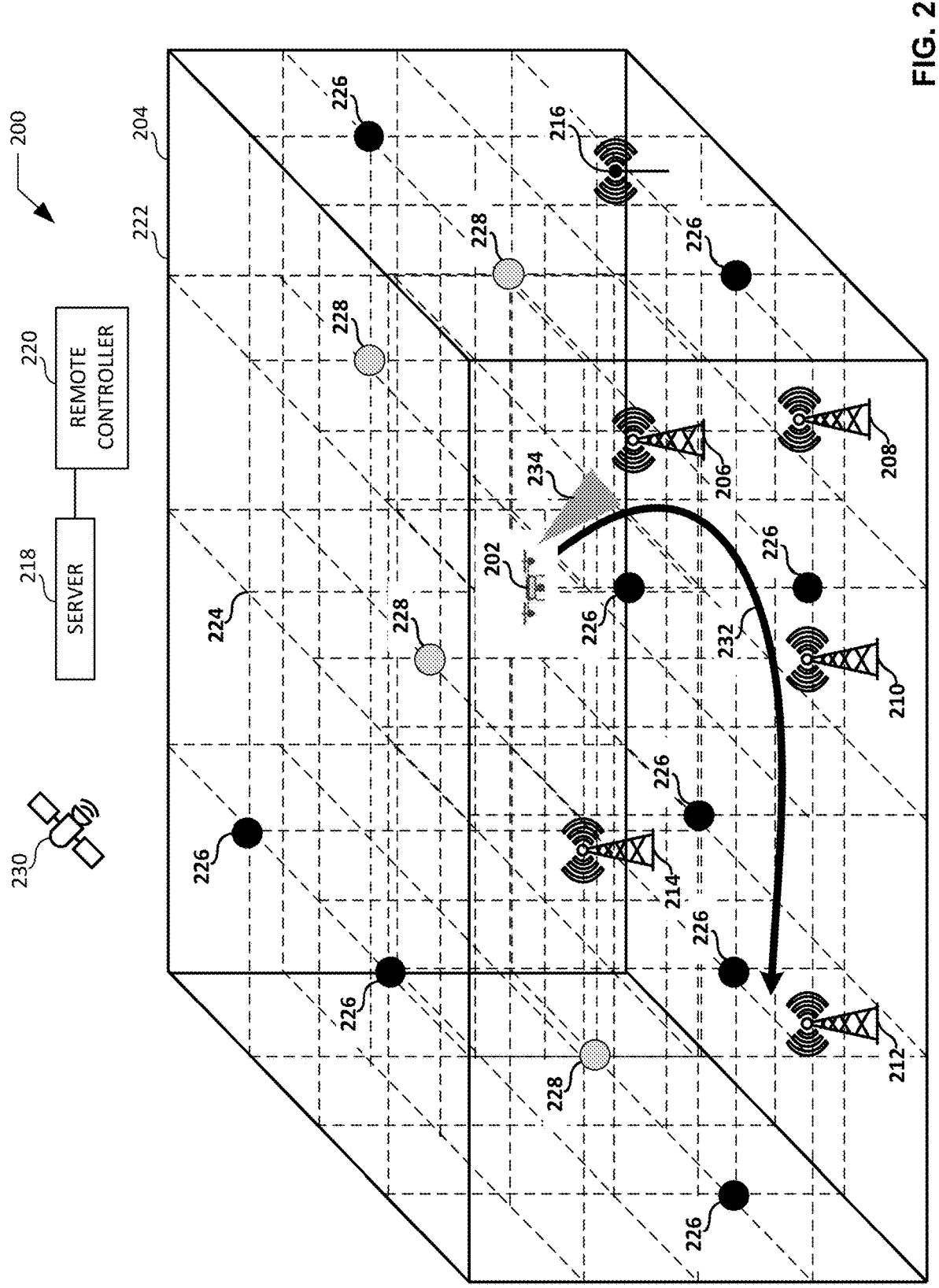
FIG. 2 illustrates an example environment of use in which an example drone traveling through an example airspace adjusts its route based on favored wireless service areas identified and selected in real time during flight of the drone.

FIG. 2 illustrates an example environment of use 200 in which an example drone 202 traveling through an example airspace 204 adjusts its route based on favored wireless service areas identified and selected in real time during flight of the drone 202. In the illustrated example of FIG. 2, the airspace 204 includes a first example cellular base station 206, a second example cellular base station 208, a third example cellular base station 210, a fourth example cellular base station 212, and a fifth example cellular base station 214. In other examples, the airspace 204 may include a different number of cellular base stations (e.g., one cellular base station, twenty cellular base stations, one hundred cellular base stations, etc.). In still other examples, the airspace 204 may additionally or alternatively (e.g., relative to the cellular base stations 206, 208, 210, 212, 214 shown in FIG. 2) include one or more wireless access point(s) (e.g., an example wireless access point 216 shown in FIG. 2) operating under one or more wireless communication protocol(s) (e.g., Wi-Fi).

Respective ones of the cellular base stations 206, 208, 210, 212, 214 of FIG. 2 (and/or, if present, the wireless access points) service associated cell(s). Each cell has the potential to provide a communication channel between a drone (e.g., the drone 202 of FIG. 2) traveling within its corresponding area of the airspace 204 of FIG. 2 and an example server 218. In the illustrated example of FIG. 2, the server 218 is located remotely from the airspace 204 of FIG. 2. In other examples, the server 218 may be located within the airspace 204 of FIG. 2. The example server 218 of FIG. 2 implements, is operatively coupled to, and/or is in communication with an example remote controller 220 (e.g., a ground based controller) capable of exchanging control data with a drone (e.g., the drone 202 of FIG. 2, or other drones) traveling within the airspace 204. Control data (e.g., control data associated with the remote controller 220) may be exchanged between the server 218 of FIG. 2 and the drone via one or more communication channel(s) associated with one or more of the cellular base station(s) 206, 208, 210, 212, 214 of FIG. 2 located within the airspace 204 of FIG. 2 and/or with one or more wireless access point(s).

In the illustrated example of FIG. 2, the server 218 develops a model to predict favored wireless service areas for a drone (e.g., the drone 202 of FIG. 2) traveling within the airspace 204 of FIG. 2. In some examples, the server 218 of FIG. 2 develops the model by forming a three-dimensional representation of the airspace 204 and dividing the three-dimensional representation of the airspace 204 into a three-dimensional grid. For example, as shown in FIG. 2, the server 218 has divided an example three-dimensional representation 222 of the airspace 204 into an example three-dimensional, cubic grid 224 having dimensions 4×4×4. In other examples, the grid 224 of FIG. 2 may have other dimensions (e.g., 1×1×1, 10×10×10, 100×100×50, etc.) and/or other shapes (e.g., non-cubic and/or non-rectangular shapes) differing from the dimensions and/or shape of the grid 224 shown in FIG. 2.

The server 218 of FIG. 2 develops the model by identifying example sampling locations 226 within the grid 224 of FIG. 2 from which reference signal strength data associated with one or more of the cellular base station(s) 206, 208, 210, 212, 214 and/or reference signal strength data associated with one or more wireless access point(s) is to be collected and/or sampled. In some examples, the server 218 of FIG. 2 instructs, controls, and/or commands one or more drone(s) (e.g., the drone 202 of FIG. 2, or other drones) to travel to and collect reference signal strength data from the sampling locations 226 within the grid 224, and to transmit the collected reference signal strength data back to the server 218. In some such examples, the reference signal strength data received at the server 218 from the drone(s) may include and/or be associated with sampling location data indicating the sampling location 226 from which the reference signal strength data was collected, cell identifier data indicating one or more cell(s) from which the reference signal strength data was collected, cellular base station identifier data indicating one or more of the cellular base station(s) 206, 208, 210, 212, 214 from which the reference signal strength data was collected, area identifier data indicating one or more area(s) from which the reference signal strength data was collected, and/or wireless access point identifier data indicating one or more wireless access point(s) from which the reference signal strength data was collected.

The server 218 of FIG. 2 further develops the model by evaluating the received reference signal strength data to determine one or more favored wireless service area(s) for each of the sampling locations 226 within the grid 224. In some examples, the server 218 may select the wireless service area having the greatest reference signal strength associated with a sampling location 226 to be the favored wireless service area for the sampling location 226. In other examples, the server 218 may select all wireless service areas associated with a sampling location 226 and having associated reference signal strengths that exceed a signal strength threshold to be the favored wireless service areas for the sampling location 226.

The server 218 of FIG. 2 further develops the model by using the favored wireless service area data associated with the sampling locations 226 within the grid 224 to generate favored wireless service area data associated with other locations (e.g., locations other than the sampling locations 226) within the grid 224. In some examples, the server 218 may generate the favored wireless service area data by implementing and/or executing a conditional random field (CRF) process. In some such examples, the server 218 may utilize the favored wireless service area data associated with the sampling locations 226 as input for the CRF process.

In some examples, the server 218 of FIG. 2 may further develop the model by receiving additional reference signal strength data associated with one or more example alternate location(s) 228 within the grid 224 (e.g., locations other than the sampling locations 226) from one or more drone(s) that may collect and/or sample such additional reference signal strength data with or without having been instructed, controlled, and/or commanded to do so by the server 218. In some such examples, the additional reference signal strength data received at the server 218 from the drone(s) may include and/or be associated with alternate location data indicating the alternate location 228 from which the additional reference signal strength data was collected, cell identifier data indicating one or more cell(s) from which the additional reference signal strength data was collected, cellular base station identifier data indicating one or more of the cellular base station(s) 206, 208, 210, 212, 214 from which the additional reference signal strength data was collected, area identifier data indicating one or more area(s) from which the additional reference signal strength data was collected, and/or wireless access point identifier data indicating one or more wireless access point(s) from which the additional reference signal strength data was collected.

In some examples, the server 218 of FIG. 2 further develops the model by evaluating the received additional reference signal strength data to determine one or more favored wireless service area(s) for each of the alternate locations 228 within the grid 224. In some examples, the server 218 may select the wireless service area having the greatest reference signal strength associated with an alternate location 228 to be the favored wireless service area for the alternate location 228. In other examples, the server 218 may select all wireless service areas associated with an alternate location 228 and having associated reference signal strengths that exceed a signal strength threshold to be the favored wireless service areas for the alternate location 228.

In some examples, the server 218 of FIG. 2 further develops the model by using the favored wireless service area data associated with the alternate locations 228 within the grid 224, together with the favored wireless service area data associated with the sampling locations 226 within the grid 224, to generate favored wireless service area data associated with other locations (e.g., locations other than the alternate locations 228 and other than the sampling locations 226) within the grid 224. In some examples, the server 218 may generate the favored wireless service area data by implementing and/or executing the CRF process referenced above. In some such examples, the server 218 may utilize the favored wireless service area data associated with the sampling locations 226 along with the favored wireless service area data associated with the alternate locations 228 as inputs for the CRF process.

In some examples, the model developed by the server 218 of FIG. 2 may be updated and/or trained on an ongoing basis (e.g., a periodic basis, a continuous basis, etc.). In some examples, the model may be updated and/or trained based on, or in response to, the server 218 receiving updated (e.g., new) reference signal strength data associated with the sampling locations 226 of the grid 224. The model may additionally or alternatively be updated and/or trained based on, or in response to, the server 218 receiving updated (e.g., new) additional reference signal strength data associated with the alternate locations 228 of the grid 224. In some examples, the model may be updated and/or trained based on the updated reference signal strength data and/or the updated additional reference signal strength data received at the server 218 to determine the favored wireless service area(s) associated with such updated data.

The server 218 of FIG. 2 transmits the model (e.g., the developed model) to the drone 202 of FIG. 2. In some examples, the server 218 may transmit the model to the drone 202 prior to the drone 202 entering the airspace 204 of FIG. 2 (e.g., before beginning its journey, during a charging process, etc.). In other examples, the server 218 may transmit the model to the drone 202 while the drone is in flight traveling within the airspace 204 of FIG. 2. For example, the server 218 of FIG. 2 may transmit the model to the drone 202 of FIG. 2 via one or more of the cellular base station(s) 206, 208, 210, 212, 214, or one or more of the wireless access points located within the airspace 204 of FIG. 2.

The drone 202 of FIG. 2 includes a GPS receiver to collect and/or receive location data determined via example GPS satellites 230. Additionally or alternatively, the drone 202 may determine location data via base station triangulation based on signals recorded from three or more of the cellular base stations 206, 208, 210, 212, 214. Location data collected and/or received by the drone 202 enables the drone 202 to determine, detect, and/or identify its location within the grid 224 and/or, more generally, within the airspace 204 of FIG. 2. A route and/or travel path of the drone 202 may be based on such location data, and may further be based on destination data known to and/or communicated to the drone. For example, the drone 202 may travel along an example route 232 within the grid 224 and/or, more generally, within the airspace 204 of FIG. 2 based on the location data collected by the drone 202, and further based on destination data known to and/or communicated to the drone 202.

In the illustrated example of FIG. 2, the drone 202 includes a directional antenna having an example associated directional communication beam 234 that may be steered and/or positioned in a desired direction. In some examples, the drone 202 may adjust its position and/or the direction of travel of the drone 202 relative to the route 232 of FIG. 2 to steer the directional communication beam 234 of the drone 202 toward one or more of the favored wireless service area(s) identified and/or determined via the above-described model received from the server 218 of FIG. 2, thereby improving the likelihood that the drone 202 will maintain a communication channel with the server 218. These model-based adjustments can be made without measuring reference signal strengths in flight, but instead based on the data pre-developed by the model. In such examples, the model advantageously enables the drone 202 of FIG. 2 to make, and/or to determine the need for, such adjustments in real time during a flight of the drone 202 without the drone 202 having to consume time and/or processing resources that would otherwise be associated with measuring, obtaining, and/or evaluating reference signal strength data associated with the airspace 204 of FIG. 2 in real time during flight.

In other examples, the drone 202 of FIG. 2 may alternatively include an omnidirectional antenna having an associated omnidirectional communication beam. In such other examples, the drone 202 may adjust its position and/or its direction of travel relative to the route 232 of FIG. 2 to move the omnidirectional antenna and/or, more generally, the drone 202 toward one or more of the favored wireless service area(s) identified and/or determined via the above-described model received from the server 218 of FIG. 2, thereby improving the likelihood that the drone 202 will maintain a communication channel with the server 218. These model-based adjustments can be made without measuring reference signal strengths in flight, but instead based on the data pre-developed by the model. In such other examples, the model advantageously enables the drone 202 of FIG. 2 to make, and/or to determine the need for, such adjustments in real time during a flight of the drone 202 without the drone 202 having to consume time and/or processing resources that would otherwise be associated with measuring, obtaining, and/or evaluating reference signal strength data associated with the airspace 204 of FIG. 2 in real time during flight.

Figure 3:
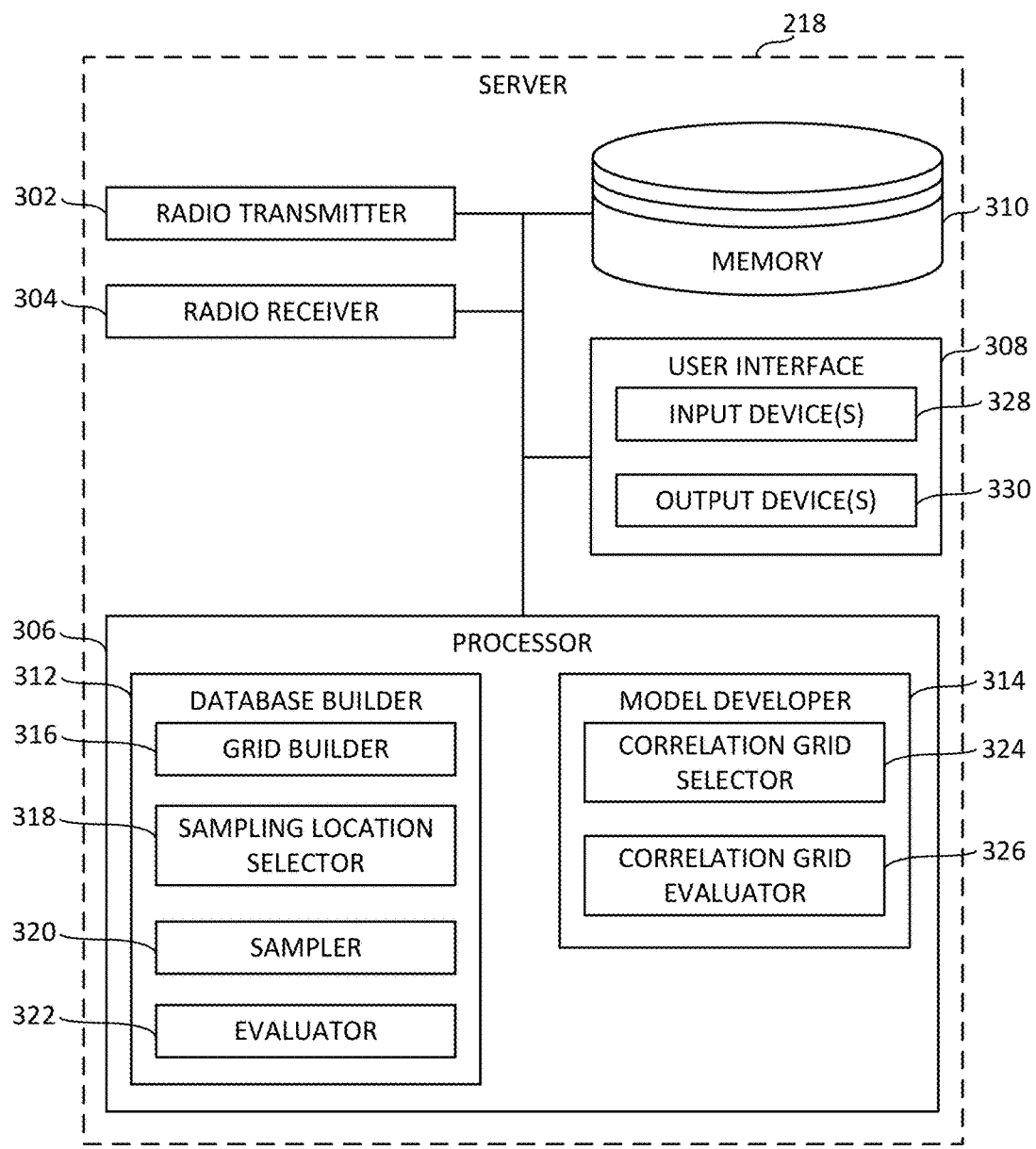
FIG. 3 is a block diagram of an example implementation of the server of FIG. 2 constructed in accordance with the teachings of this disclosure.

FIG. 3 is a block diagram of an example implementation of the server 218 of FIG. 2 constructed in accordance with the teachings of this disclosure. In the illustrated example of FIG. 3, the server 218 includes an example radio transmitter 302, an example radio receiver 304, an example processor 306, an example user interface 308, and an example memory 310. However, other example implementations of the server 218 may include fewer or additional structures.

The example radio transmitter 302 of FIG. 3 transmits data via one or more radio frequency signal(s) to other devices (e.g., the drone 202 of FIG. 2, other drones, etc.). In some examples, the data and/or signal(s) transmitted by the radio transmitter 302 is/are communicated over a cellular network via one or more cellular base station(s) (e.g., the cellular base station(s) 206, 208, 210, 212, 214 of FIG. 2). In other examples, the data and/or signal(s) transmitted by the radio transmitter 302 may alternatively be communicated over a local wireless area network via one or more wireless access point(s) operating in accordance with one or more wireless communication protocol(s) such as Wi-Fi.

In some examples, the data and/or signal(s) transmitted by the radio transmitter 302 of FIG. 3 may include control data for a drone (e.g., data associated with controlling the flight operations and/or the route of the drone). In some examples, the data and/or signal(s) transmitted by the radio transmitter 302 may include and/or correspond to one or more instruction(s), command(s), and/or request(s) for a drone to travel to, and/or to collect reference signal strength data from, one or more sampling location(s) within an airspace. In some examples, the data and/or signal(s) transmitted by the radio transmitter 302 of FIG. 3 may include a model for a drone to identify favored wireless service areas. In some examples, the model may include favored wireless service areas associated with an airspace within which the drone is traveling and/or within which the drone is to travel. In the example of FIG. 3, the transmitter 302 is a means to transmit a model to a drone. Data corresponding to the signal(s) to be transmitted by the radio transmitter 302 may be of any type, form and/or format, and may be stored in a non-transitory computer-readable storage medium such as the example memory 310 of FIG. 3 described below.

The example radio receiver 304 of FIG. 3 collects, acquires and/or receives data and/or one or more radio frequency signal(s) from other devices (e.g., the drone 202 of FIG. 2, other drones, etc.). In some examples, the data and/or signal(s) received by the radio receiver 304 is/are communicated over a cellular network via one or more cellular base station(s) (e.g., the cellular base station(s) 206, 208, 210, 212, 214 of FIG. 2). In other examples, the data and/or signal(s) received by the radio receiver 304 may alternatively be communicated over a local wireless area network via one or more wireless access point(s).

In some examples, the data and/or signal(s) received by the radio receiver 304 of FIG. 3 may include and/or correspond to reference signal strength data collected by one or more drone(s). In some examples, the reference signal strength data may be associated with a location of a drone within an airspace. In some examples, the reference signal strength data may be associated with one or more cell(s) and/or wireless service area(s) located within the airspace. Data carried by, identified and/or derived from the signal(s) collected and/or received by the radio receiver 304 may be of any type, form and/or format, and may be stored in a non-transitory computer-readable storage medium such as the example memory 310 of FIG. 3 described below.

The example processor 306 of FIG. 3 may be implemented by a semiconductor device such as a microprocessor or microcontroller. The processor 306 manages and/or controls the operation of the server 218. The example processor 306 of FIG. 3 includes an example database builder 312 and an example model developer 314. In some examples, the processor 306 manages and/or controls the operation of the processor 306 based on data, information and/or one or more signal(s) obtained and/or accessed by the processor 306 from one or more of the radio receiver 304, the user interface 308, the memory 310, the database builder 312, and/or the model developer 314 of FIG. 3, and/or based on data, information and/or one or more signal(s) provided by the processor 306 to one or more of the radio transmitter 302, the user interface 308, the memory 310, the database builder 312, and/or the model developer 314 of FIG. 3.

The example database builder 312 of FIG. 3 builds, constructs, and/or otherwise forms a database including data associated with favored wireless service areas for an airspace. In the illustrated example of FIG. 3, the database builder 312 includes an example grid builder 316, an example sampling location selector 318, an example sampler 320, and an example evaluator 322. The database built via the database builder 312 is to be used as a source of input data for a model to be developed via the model developer 314 of FIG. 3. In the example of FIG. 3, the database builder 312 is a database building means to build a database of favored wireless service areas based on reference signal strength data sampled from a subset of grid locations from among a plurality of grid locations of a grid corresponding to an airspace. Data corresponding to the database built by the database builder 312 may be of any type, form and/or format, and may be stored in a non-transitory computer-readable storage medium such as the example memory 310 of FIG. 3 described below.

The example grid builder 316 of FIG. 3 builds, constructs, and/or otherwise forms a three-dimensional representation of an airspace (e.g., the three-dimensional representation 222 of the airspace 204 of FIG. 2). The grid builder 316 also builds, constructs, and/or otherwise forms a grid (e.g., the grid 224 of FIG. 2) based on the three-dimensional representation of the airspace. For example, the grid builder 316 may build a grid (e.g., the grid 224 of FIG. 2) by dividing a three-dimensional representation of an airspace (e.g., the three-dimensional representation 222 of the airspace 204 of FIG. 2) into continuous segments bounded by fixed nodes.

The respective nodes of the grid built by the grid builder 316 of FIG. 3 correspond to respective locations within the three-dimensional representation and/or, more generally, within the airspace. For example, a grid having dimensions 3×3×3 will have 64 nodes (e.g., calculated as 4×4×4) corresponding to 64 locations within the three-dimensional representation of the airspace. The three-dimensional representation of the airspace built by the grid builder 316 may have any size, shape, and/or dimensions. The grid built by the grid builder 316 may have any size, shape, and/or dimensions falling within the size, shape, and/or dimensions of the three-dimensional representation. In the example of FIG. 3, the grid builder 316 is a means to build a grid based on a three-dimensional representation of an airspace. Data corresponding to the three-dimensional representation, the grid, and/or the nodes and/or locations of the grid built by the grid builder 316 may be of any type, form and/or format, and may be stored in a non-transitory computer-readable storage medium such as the example memory 310 of FIG. 3 described below.

Figure 4:
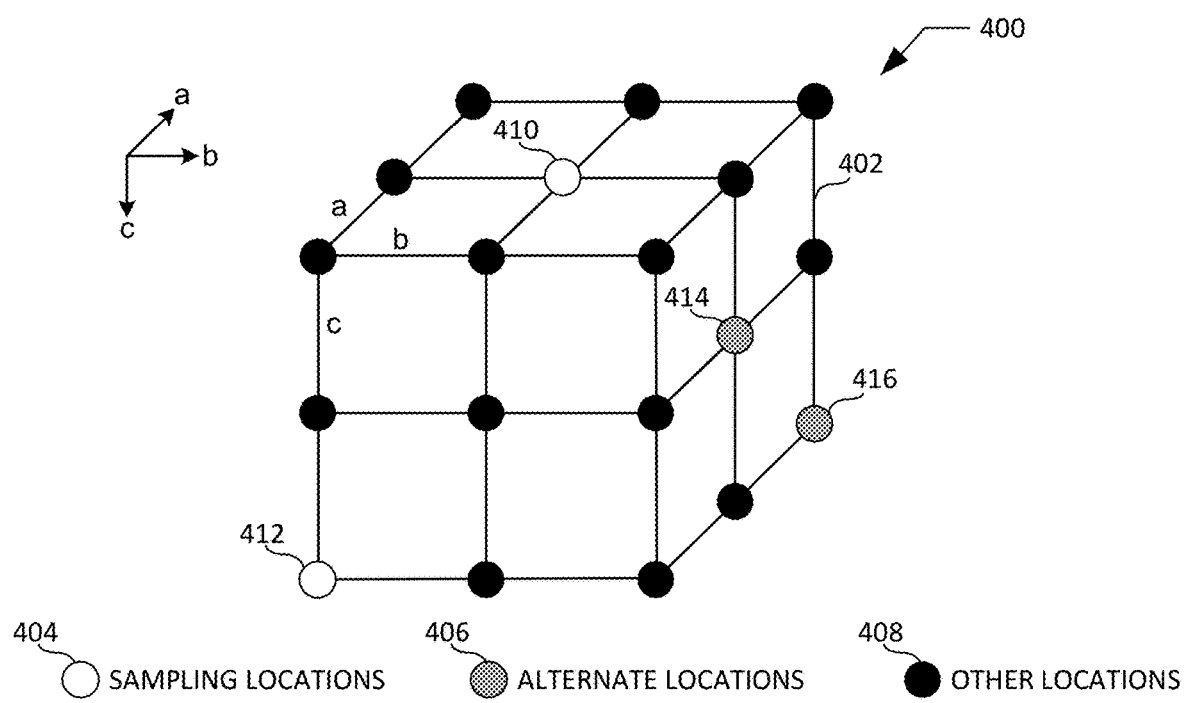
FIG. 4 is an example three-dimensional representation including an example grid built by the example grid builder of FIG. 3.

FIG. 4 is an example three-dimensional representation 400 including an example grid 402 built by the grid builder 316 of FIG. 3. The three-dimensional representation 400 of FIG. 4 has dimensions of (a)×(b)×(c). The grid 402 of FIG. 4 has dimensions of 2×2×2, and accordingly has a total of 27 (e.g., calculated as 3×3×3) nodes and/or locations. In the illustrated example of FIG. 4, the nodes and/or locations of the grid 402 include example sampling locations 404, example alternate locations 406, and example other locations 408. The sampling locations 404 of the grid 402 that are visible in FIG. 4 include a first example sampling location 410 having a coordinate position of (a1, b1, c0) within the grid 402, and a second example sampling location 412 having a coordinate position of (a0, b0, c2) within the grid. The alternate locations 406 of the grid 402 that are visible in FIG. 4 include a first example alternate location 414 having a coordinate position of (a1, b2, c1) within the grid 402, and a second example alternate location 416 having a coordinate position of (a2, b2, c2) within the grid. The other locations 408 of the grid 402 include the locations of the grid 402 other than the sampling locations 404 and the alternate locations 406 of the grid 402. The sampling locations 404, alternate locations 406, and other locations 408 of the grid 402 of FIG. 4 are further described below.

The example sampling location selector 318 of FIG. 3 selects and/or identifies sampling locations from among the nodes and/or locations of the grid built by the grid builder 316 of FIG. 3. For example, in the illustrated example of FIG. 4, the sampling location selector 318 has selected the first sampling location 410 and the second sampling location 412 as sampling locations for the grid 402. In some examples, the sampling location selector 318 may select (e.g., randomly or pseudo-randomly select) the sampling locations of the grid as a predetermined and/or threshold number of nodes and/or locations (e.g., 5 locations, 10 locations, 100 locations, etc.) from among the total number of nodes and/or locations of the grid. In other examples, the sampling location selector 318 may select (e.g., randomly or pseudo-randomly select) the sampling locations of the grid as a predetermined and/or threshold percentage (e.g., 1%, 5%, 10%, etc.) of nodes and/or locations from among the total number of nodes and/or locations of the grid. In the example of FIG. 3, the sampling location selector 318 is a means to select a subset of grid locations from among a plurality of grid locations. Data corresponding to the sampling locations selected by the sampling location selector 318 may be of any type, form and/or format, and may be stored in a non-transitory computer-readable storage medium such as the example memory 310 of FIG. 3 described below.

The example sampler 320 of FIG. 3 instructs, controls, and/or commands one or more drone(s) (e.g., the drone 202 of FIG. 2, or other drones) to travel to and collect reference signal strength data from sampling locations within the grid corresponding to the sampling locations selected and/or identified by the sampling location selector 318 of FIG. 3. The sampler 320 of FIG. 3 further instructs, controls, and/or commands the one or more drone(s) to transmit the collected reference signal strength data to the evaluator 322 and/or, more generally, to the server 218 of FIG. 3. For example, in connection with the illustrated example of FIG. 4, the sampler 320 may instruct one or more drone(s) to travel to and collect reference signal strength data from the first sampling location 410 and the second sampling location 412 within the grid 402, and may further instruct the drone(s) to transmit the collected reference signal strength data to the evaluator 322 and/or the server 218 of FIG. 3. Instructions and/or commands issued via the sampler 320 of FIG. 3 may be transmitted to the drone(s) via the radio transmitter 302 of FIG. 3. In some examples, the instructions and/or commands issued via the sampler 320 may take the form of requests for information and/or data from the drone(s). In the example of FIG. 3, the sampler 320 is a means to instruct one or more drones to collect reference signal strength data from a subset of grid locations. Data corresponding to the instructions and/or commands issued by the sampler 320 may be of any type, form and/or format, and may be stored in a non-transitory computer-readable storage medium such as the example memory 310 of FIG. 3 described below.

The reference signal strength data to be collected by the drone(s) at the sampling location(s) may be of any type and/or form. For example, the reference signal strength data may include reference signal receive power (RSRP) data, reference signal strength indicator (RSSI) data, and/or reference signal receive quality (RSRQ) data. The reference signal strength data to be collected by the drone(s) at each sampling location is to be associated with one or more cell(s) of one or more cellular base station(s) located within the grid of the three-dimensional representation of the airspace (e.g., the cell(s) of the cellular base station(s) 206, 208, 210, 212, 214 located within the grid 224 of the three-dimensional representation 222 of the airspace 204 of FIG. 2), and/or one or more area(s) of one or more wireless access point(s).

In some examples, the reference signal strength data received at the evaluator 322 and/or the server 218 of FIG. 3 from the drone(s) may include and/or be associated with sampling location data indicating the sampling location from which the reference signal strength data was collected, cell identifier data indicating one or more cell(s) from which the reference signal strength data was collected, cellular base station identifier data indicating one or more cellular base station(s) from which the reference signal strength data was collected, area identifier data indicating one or more area(s) from which the reference signal strength data was collected, and/or wireless access point identifier data indicating one or more of wireless access point(s) from which the reference signal strength data was collected. Data corresponding to the reference signal strength data received at the evaluator 322 and/or the server 218 of FIG. 3 from the drone(s) may be of any type, form and/or format, and may be stored in a non-transitory computer-readable storage medium such as the example memory 310 of FIG. 3 described below.

The example evaluator 322 of FIG. 3 evaluates reference signal strength data received at the server 218 of FIG. 3 (e.g., reference signal strength data transmitted from the drone(s) to the server 218 in response to the instructions, commands, and/or requests issued via the sampler 320 of FIG. 3) to determine one or more favored wireless service area(s) for respective ones of the sampling locations within the grid. For example, in connection with the illustrated example of FIG. 4, the evaluator 322 may evaluate reference signal strength data received at the server 218 of FIG. 3 to determine one or more favored wireless service area(s) for respective ones of the first sampling location 410 and the second sampling location 412 of the grid 402. In some examples, the evaluator 322 may select the wireless service area having the greatest reference signal strength associated with a sampling location to be the favored wireless service area for the sampling location. In other examples, the evaluator 322 may select all wireless service areas associated with a sampling location and having associated reference signal strengths that exceed a signal strength threshold to be the favored wireless service areas for the sampling location. In the example of FIG. 3, the evaluator 322 is a means to determine favored wireless service areas for a subset of grid locations based on reference signal strength data. Data corresponding to the favored wireless service area(s) determined by the evaluator 322 for respective ones of the sampling locations within the grid may be of any type, form and/or format, and may be stored in a non-transitory computer-readable storage medium such as the example memory 310 of FIG. 3 described below.

In some examples, the evaluator 322 of FIG. 3 may also evaluate additional reference signal strength data received at the server 218 of FIG. 3 to determine one or more favored wireless service area(s) for respective ones of alternate locations within the grid. For example, the evaluator 322 and/or, more generally, the server 218 of FIG. 3 may receive additional reference signal strength data associated with one or more example alternate location(s) within the grid (e.g., locations other than the sampling locations) from one or more drone(s) that may collect and/or sample such additional reference signal strength data without having been instructed, controlled, and/or commanded to do so by the sampler 320 of FIG. 3. In connection with the illustrated example of FIG. 4, the evaluator 322 may evaluate reference signal strength data received at the server 218 of FIG. 3 to determine one or more favored wireless service area(s) for respective ones of the first alternate location 414 and the second alternate location 416 of the grid 402.

The additional reference signal strength data collected by the drone(s) at the alternate location(s) may be of any type and/or form. For example, the reference signal strength data may include RSRP data, RSSI data, and/or RSRQ data. The reference signal strength data collected by the drone(s) at each alternate location is to be associated with one or more cell(s) of one or more cellular base station(s) located within the grid of the three-dimensional representation of the airspace (e.g., the cell(s) of the cellular base station(s) 206, 208, 210, 212, 214 located within the grid 224 of the three-dimensional representation 222 of the airspace 204 of FIG. 2), and/or one or more area(s) of one or more wireless access point(s).

In some examples, the additional reference signal strength data received at the evaluator 322 and/or the server 218 of FIG. 3 from the drone(s) may include and/or be associated with alternate location data indicating the alternate location within the grid from which the reference signal strength data was collected, cell identifier data indicating one or more cell(s) from which the reference signal strength data was collected, cellular base station identifier data indicating one or more of cellular base station(s) from which the reference signal strength data was collected, area identifier data indicating one or more area(s) from which the reference signal strength data was collected, and/or wireless access point identifier data indicating one or more of wireless access point(s) from which the reference signal strength data was collected. Data corresponding to the additional reference signal strength data received at the evaluator 322 and/or the server 218 of FIG. 3 from the drone(s) may be of any type, form and/or format, and may be stored in a non-transitory computer-readable storage medium such as the example memory 310 of FIG. 3 described below.

In some examples, the evaluator 322 may select the wireless service area having the greatest reference signal strength associated with an alternate location to be the favored wireless service area for the alternate location. In other examples, the evaluator 322 may select all wireless service areas associated with an alternate location and having associated reference signal strengths that exceed a signal strength threshold to be the favored wireless service areas for the alternate location. Data corresponding to the favored wireless service area(s) determined by the evaluator 322 for respective ones of the alternate locations within the grid may be of any type, form and/or format, and may be stored in a non-transitory computer-readable storage medium such as the example memory 310 of FIG. 3 described below.

The database builder 312 of FIG. 3 builds and maintains a database of favored wireless service areas for the sampling locations and/or the alternate locations of the grid of the three-dimensional representation of the airspace. In some examples, the database builder 312 builds and maintains the database of favored wireless service areas for the sampling locations and/or the alternate locations of the grid based on the above-described operations performed by, and/or the above-described data generated by, respective ones of the grid builder 316, the sampling location selector 318, the sampler 320, and/or the evaluator 322 of FIG. 3.

In some examples, the database built by the database builder 312 of FIG. 3 may be updated on an ongoing basis (e.g., a periodic basis, a continuous basis, etc.). In some examples, the database may be updated based on, or in response to, the evaluator 322 and/or the server 218 of FIG. 3 receiving updated (e.g., new) reference signal strength data associated with sampling locations and/or alternate locations of the grid of the grid. In some examples, the evaluator 322 of FIG. 3 may reevaluate previously received reference signal strength data in view of (e.g., together with) updated and/or more recently received reference signal strength data to redetermine the favored wireless service area(s) based on the updated data.

The example model developer 314 of FIG. 3 develops a model to predict favored wireless service areas for an airspace based on the database built by the database builder 312 of FIG. 3. For example, the model developer 314 may develop a model to predict favored wireless service areas for other locations of a grid (e.g., other locations of the example grid 224 of FIG. 2, the example other locations 408 of the example grid 402 of FIG. 4, etc.) based on the favored wireless service areas determined by the database builder 312 for the sampling locations and/or the alternate locations of the grid (e.g., the example sampling locations 226 and/or the example alternate locations 228 of the example grid 224 of FIG. 2, the example sampling locations 404 and/or the example alternate locations 406 of the example grid 402 of FIG. 4, etc.). In the illustrated example of FIG. 3, the model developer 314 of FIG. 3 includes an example correlation grid selector 324 and an example correlation grid evaluator 326. In the example of FIG. 3, the model developer 314 is a means to develop a model to predict favored wireless service areas for a plurality of grid locations based on a database. Data corresponding to the model developed by the model developer 314 may be of any type, form and/or format, and may be stored in a non-transitory computer-readable storage medium such as the example memory 310 of FIG. 3 described below.

As used herein, the term "correlation grid" refers to any continuous sub-grid of a grid. For example, a sub-grid of a grid having M×N×Q continuous locations may be described as a correlation grid The example correlation grid selector 324 of FIG. 3 selects and/or identifies a correlation grid of a grid built by the grid builder 316 of FIG. 3. For example, the correlation grid selector 324 may select (e.g., randomly or pseudo-randomly select) a correlation grid of the example grid 224 of FIG. 2, or the example grid 402 of FIG. 4. In some examples, the correlation grid selected by the correlation grid selector 324 may include one or more test location(s) to be used to train the model. The test locations may be sampling locations and/or alternate locations from a correlation grid that neighbors and/or overlaps the correlation grid selected by the correlation grid selector 324. In the example of FIG. 3, the correlation grid selector 324 is a means to select a correlation grid from a grid. Data corresponding to the correlation grid selected by the correlation grid selector 324 may be of any type, form and/or format, and may be stored in a non-transitory computer-readable storage medium such as the example memory 310 of FIG. 3 described below.

Figure 5:
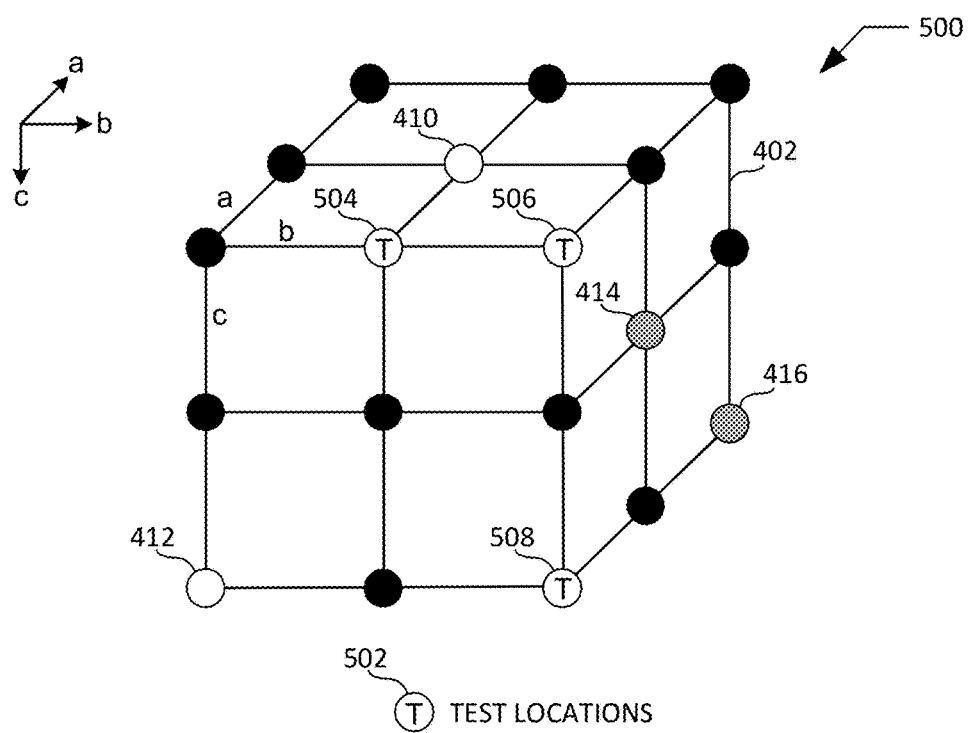
FIG. 5 illustrates an example correlation grid having example test locations for training a model.

FIG. 5 illustrates an example correlation grid 500 having example test locations 502 for training a model. In the illustrated example of FIG. 5, the test locations 502 include a first example test location 504 having a coordinate position of (a0, b1, c0) within the correlation grid 500, a second example test location 506 having a coordinate position of (a0, b2, c0) within the correlation grid 500, and a third example test location 508 having a coordinate position of (a0, b2, c2) within the correlation grid 500. The correlation grid 500 also includes the example sampling locations 404 and the example alternate locations 406 of the example grid 402 of FIG. 4 described above. The correlation grid 500 of FIG. 5 may be selected by the correlation grid selector 324 of FIG. 3.

The example correlation grid evaluator 326 of FIG. 3 develops a joint distribution with adjustable parameters to model the relationship between the grid locations (e.g., all of the grid locations) of the correlation grid selected by the correlation grid selector 324 of FIG. 3. In some examples, the correlation grid evaluator 326 may implement and/or execute a conditional random field (CRF) process that may be expressed and/or defined as follows:

$$P(x_V) = \frac{1}{Z} \prod_{v \in V} \phi_v(x_v) \prod_{(v,v') \in E} \psi_{vv'}(x_v, x_{v'})$$ Equation 1

In Equation 1, $x_V = (x_1, x_2, \ldots, x_{MNQ})$ represents all the MNQ locations favored wireless service areas. For example, $x\_1$ may be the cell and/or area identifier of a favored wireless service area for a first location. $\phi_v(v)$ is the node potential function for node v. $\psi_{vv'}(x_v, x_{v'})$ is the edge potential of (v, v'). Both $\phi$ and $\psi$ are non-negative functions parameterized by a parameter set $\theta$. Z is a normalized constant to ensure that the whole distribution sums up to 1 over its possible values.

In some examples, the functions $\phi$ and $\psi$ of Equation 1 may be expressed and/or defined as follows:

$$\phi_v(x_v) = \exp\left(\sum_{k=0}^{K} w_k \sum_{s \in S, d(s,v)=k} 1(x_v = x_s^*)\right)$$ Equation 2

$$\psi_{vv'}(x_v, x_{v'}) = \exp(m_{vv'} 1(x_v \neq x_{v'}))$$ Equation 3

In Equations 2 and 3, $x_v$ is a random variable representing the optimum cell and/or area identifier of grid location v. K is the maximum distance in hops between two locations in the correlation grid. $w_k$ and $m_{vv'}$ are the model parameters (e.g., $\theta$). $w_k$ is the trained parameters for locations which are k-hops away. S is the set of sampling locations. $x_s^*$ is the optimal cell and/or area identifier of the sampling point s. d(s, v) is the distance in hops between s and v in the grid.

The parameter set $\theta$ is to be determined based on the sampling locations. Once the parameter set $\theta$ has been determined, a maximum likelihood process may be applied to predict favored wireless service areas for any location of the correlation grid. In some examples, a maximum likelihood process associated with Equation 1 may be expressed and/or defined as:

$$P(x_V^*) = \max_{x_V} \frac{1}{Z} \prod_{v \in V} \phi_v(x_v) \prod_{(v,v') \in E} \psi_{vv'}(x_v, x_{v'})$$ Equation 4

In the example of FIG. 3, the correlation grid developer 326 is a means to predict favored wireless service areas for correlation grid locations. Data corresponding to the favored wireless service areas determined by the correlation grid evaluator 326 for the respective locations of the correlation grid selected by the correlation grid selector 324 may be of any type, form and/or format, and may be stored in a non-transitory computer-readable storage medium such as the example memory 310 of FIG. 3 described below.

In some examples, the correlation grid selector 324, the correlation grid evaluator 326, and/or, more generally, the model developer 314 of FIG. 3 may update, train, and/or refine the model by continuing to select and evaluate different correlation grids of the grid in the same manner described above. In some examples, the model developer 314 of FIG. 3 may receive one or more input(s), instruction(s), and/or command(s) via the user interface 308 of FIG. 3 providing an indication as to whether the model developer 314 is to continue updating, training, and/or refining the model.

The model developed by the model developer 314 of FIG. 3 may be transmitted to a drone. For example, the model developed by the model developer 314 may be transmitted via the radio transmitter 302 of the server 218 of FIGS. 2 and/or 3 to the drone 202 of FIG. 2. In some examples, the model may be transmitted to the drone prior to the drone traveling into the airspace with which the model is associated (e.g., the airspace 204 of FIG. 2). In other examples, the model may be transmitted to the drone while the drone is traveling within the airspace with which the model is associated (e.g., the airspace 204 of FIG. 2). In some examples, the model may be transmitted to the drone in response to a request for the model received at the example server 218 of FIGS. 2 and/or 3 from the drone.

The example user interface 308 of FIG. 3 facilitates interactions and/or communications between an end user and the server 218. The user interface 308 includes one or more input device(s) 328 via which the user may input information and/or data to the server 218. For example, the user interface 308 may be a button, a switch, a microphone, and/or a touchscreen that enable(s) the user to convey data and/or commands to the example processor 306 of FIG. 3 described above, and/or, more generally, to the server 218 of FIGS. 2 and/or 3. The user interface 308 of FIG. 3 also includes one or more output device(s) 330 via which the user interface 308 presents information and/or data in visual and/or audible form to the user. For example, the user interface 308 may include a light emitting diode, a touchscreen, and/or a liquid crystal display for presenting visual information, and/or a speaker for presenting audible information. Data and/or information that is presented and/or received via the user interface 308 may be of any type, form and/or format, and may be stored in a non-transitory computer-readable storage medium such as the example memory 310 of FIG. 3 described below.

The example memory 310 of FIG. 3 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 310 may be stored in any file and/or data structure format, organization scheme, and/or arrangement.

The memory 310 is accessible to one or more of the example radio transmitter 302, the example radio receiver 304, the example processor 306 (e.g., including one or more of the example database builder 312, the example model developer 314, the example grid builder 316, the example sampling location selector 318, the example sampler 320, the example evaluator 322, the example correlation grid selector 324, and/or the example correlation grid evaluator 326), the example user interface 308, and/or, more generally, the server 218 of FIGS. 2 and/or 3.

While an example manner of implementing the server 218 of FIG. 2 is illustrated in FIG. 3, one or more of the elements, processes and/or devices illustrated in FIG. 3 may be combined, divided, re-arranged, omitted, eliminated and/or implemented in any other way. Further, the example radio transmitter 302, the example radio receiver 304, the example processor 306, the example user interface 308, the example memory 310, the example database builder 312, the example model developer 314, the example grid builder 316, the example sampling location selector 318, the example sampler 320, the example evaluator 322, the example correlation grid selector 324, and/or the example correlation grid evaluator 326 of FIG. 3 may be implemented by hardware, software, firmware and/or any combination of hardware, software and/or firmware. Thus, for example, any of the example radio transmitter 302, the example radio receiver 304, the example processor 306, the example user interface 308, the example memory 310, the example database builder 312, the example model developer 314, the example grid builder 316, the example sampling location selector 318, the example sampler 320, the example evaluator 322, the example correlation grid selector 324, and/or the example correlation grid evaluator 326 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example radio transmitter 302, the example radio receiver 304, the example processor 306, the example user interface 308, the example memory 310, the example database builder 312, the example model developer 314, the example grid builder 316, the example sampling location selector 318, the example sampler 320, the example evaluator 322, the example correlation grid selector 324, and/or the example correlation grid evaluator 326 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example server 218 of FIGS. 2 and/or 3 may include one or more elements, processes and/or devices in addition to, or instead of, those illustrated in FIG. 3, and/or may include more than one of any or all of the illustrated elements, processes and devices.

Figure 6:
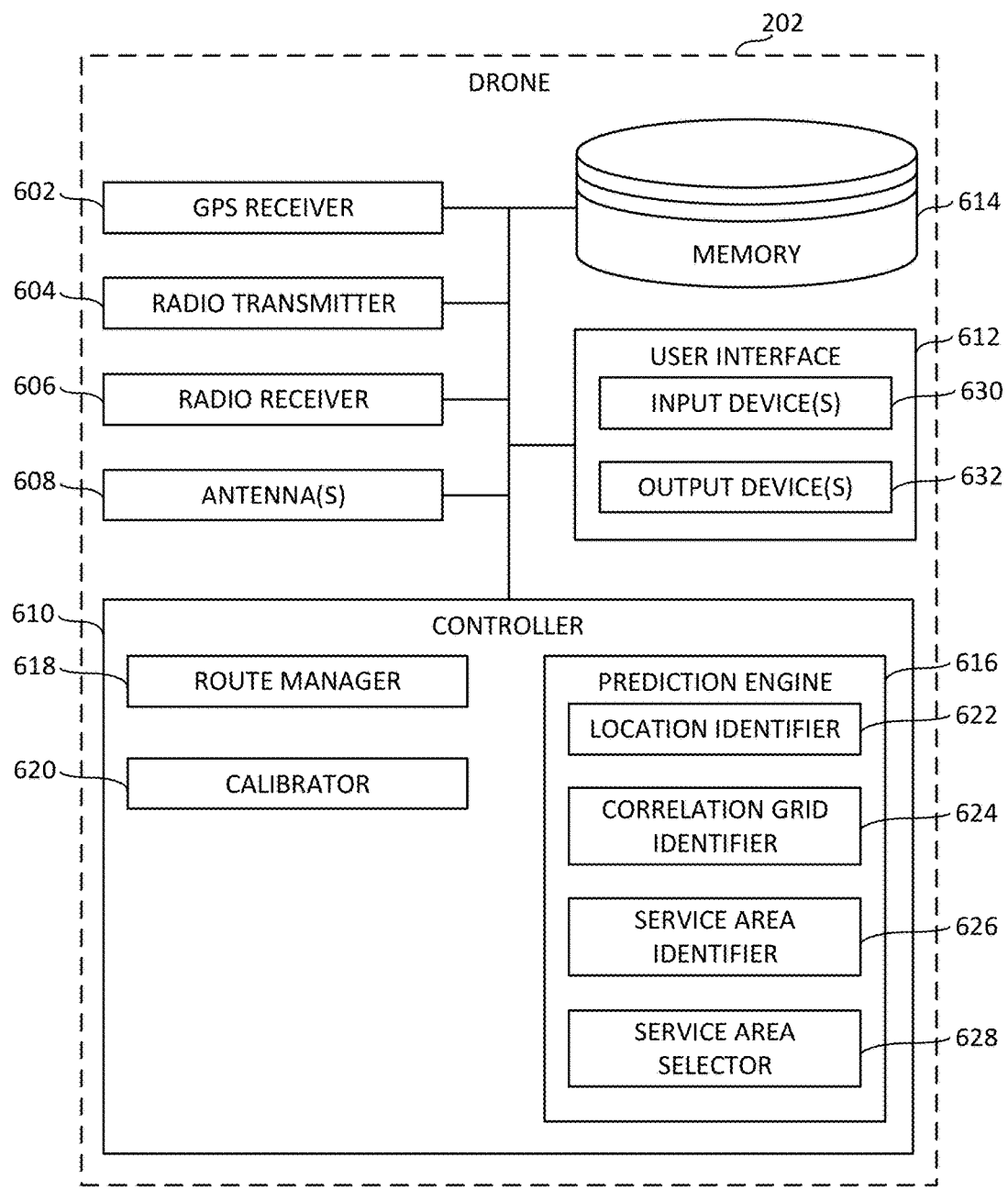
FIG. 6 is a block diagram of an example implementation of the drone of FIG. 2 constructed in accordance with the teachings of this disclosure.

FIG. 6 is a block diagram of an example implementation of the drone 202 of FIG. 2 constructed in accordance with the teachings of this disclosure. In the illustrated example of FIG. 6, the drone 202 includes an example GPS receiver 602, an example radio transmitter 604, an example radio receiver 606, one or more example antenna(s) 608, an example controller 610, an example user interface 612, and an example memory 614. However, other example implementations of the drone 202 may include fewer or additional structures.

The example GPS receiver 602 of FIG. 6 collects, acquires and/or receives data and/or one or more signal(s) from one or more GPS satellite(s) (e.g., represented by the GPS satellites 230 of FIG. 2). Typically, signals from three or more satellites are needed to form the GPS triangulation. The data and/or signal(s) received by the GPS receiver 602 may include information (e.g., time stamps) from which the current position and/or location of the drone 202 may be identified and/or derived, including for example, the current latitude, longitude and altitude of the drone 202. Location data identified and/or derived from the signal(s) collected and/or received by the GPS receiver 602 may be associated with one or more local time(s) (e.g., time stamped) at which the data and/or signal(s) were collected and/or received by the GPS receiver 602. In some examples, a local clock is used to timestamp the location data. Location data identified and/or derived from the signal(s) collected and/or received by the GPS receiver 602 may be of any type, form and/or format, and may be stored in a non-transitory computer-readable storage medium such as the example memory 614 of FIG. 6 described below.

The example radio transmitter 604 of FIG. 6 transmits data via one or more radio frequency signal(s) to other devices (e.g., the server 218 of FIGS. 2 and/or 3, etc.). In some examples, the data and/or signal(s) transmitted by the radio transmitter 604 is/are communicated over a cellular network via one or more cellular base station(s) (e.g., the cellular base station(s) 206, 208, 210, 212, 214 of FIG. 2). In other examples, the data and/or signal(s) transmitted by the radio transmitter 604 may alternatively be communicated over a local wireless area network via one or more wireless access point(s) operating in accordance with one or more wireless communication protocol(s) such as Wi-Fi.

In some examples, the data and/or signal(s) transmitted by the radio transmitter 604 of FIG. 6 may include control data for the drone 202 (e.g., data associated with controlling the flight operations and/or the route of the drone 202). In some examples, the data and/or signal(s) transmitted by the radio transmitter 604 may include and/or correspond to reference signal strength data collected by the drone 202 from one or more sampling location(s) within an airspace. In some examples, the data and/or signal(s) transmitted by the radio transmitter 604 of FIG. 6 may include and/or correspond to one or more request(s) for a model to predict favored wireless service areas associated with an airspace within which the drone 202 is traveling and/or within which the drone 202 is to travel. Data corresponding to the signal(s) to be transmitted by the radio transmitter 604 may be of any type, form and/or format, and may be stored in a non-transitory computer-readable storage medium such as the example memory 614 of FIG. 6 described below.

The example radio receiver 606 of FIG. 6 collects, acquires and/or receives data and/or one or more radio frequency signal(s) from other devices (e.g., the server 218 of FIGS. 2 and/or 3, etc.). In some examples, the data and/or signal(s) received by the radio receiver 606 is/are communicated over a cellular network via one or more cellular base station(s) (e.g., the cellular base station(s) 206, 208, 210, 212, 214 of FIG. 2). In other examples, the data and/or signal(s) received by the radio receiver 606 may alternatively be communicated over a local wireless area network via one or more wireless access point(s) operating in accordance with one or more wireless communication protocol(s) such as Wi-Fi.

In some examples, the data and/or signal(s) received by the radio receiver 606 of FIG. 6 may include control data for the drone 202 (e.g., data associated with controlling the flight operations and/or the route of the drone 202). In some examples, the data and/or signal(s) received by the radio receiver 606 of FIG. 6 may include and/or correspond to one or more instruction(s), command(s), and/or request(s) for the drone 202 to travel to, and/or to collect reference signal strength data from, one or more sampling location(s) within an airspace. In some examples, the data and/or signal(s) received by the radio receiver 606 of FIG. 6 may include and/or correspond to a model to predict favored wireless service areas for the drone 202 as the drone 202 travels through an airspace. Data carried by, identified and/or derived from the signal(s) collected and/or received by the radio receiver 606 may be of any type, form and/or format, and may be stored in a non-transitory computer-readable storage medium such as the example memory 614 of FIG. 6 described below.

The example antenna(s) 608 of FIG. 6 provide one or more interface(s) between the radio transmitter 604 and/or the radio receiver 606 of FIG. 6 and radio waves and/or radio signals propagating through, or to be propagated through, an airspace. In some examples, the antenna(s) 608 may include a first antenna associated with the radio transmitter 604 of FIG. 6 and a second antenna associated with the radio receiver 606 of FIG. 6. In other examples, the antenna(s) 608 may include a single antenna associated with both the radio transmitter 604 and the radio receiver 606 of FIG. 6. In some examples, the antenna 608 or, in the case of multiple antennas, respective ones of the antennas 608 of FIG. 6 may be implemented as a directional antenna having an associated directional communication beam that that may be steered and/or positioned (e.g., either by changing the direction and/or position of the antenna 608 relative to the direction and/or position of the drone 202, or by changing the direction and/or position of the drone 202 itself) in a desired direction. In other examples, the antenna 608 or, in the case of multiple antennas, respective ones of the antenna(s) 608 of FIG. 6 may be implemented as an omnidirectional antenna having an associated omnidirectional communication beam that radiates uniformly in all directions within a plane of an airspace.

The example controller 610 of FIG. 6 may be implemented by a semiconductor device such as a microprocessor or microcontroller. The controller 610 manages and/or controls the operation of the drone 202. In the illustrated example of FIG. 6, the example controller 610 includes an example prediction engine 616, an example route manager 618, and an example calibrator 620. In some examples, the controller 610 manages and/or controls the operation of the drone 202 based on data, information and/or one or more signal(s) obtained and/or accessed by the controller 610 from one or more of the GPS receiver 602, the radio receiver 606, the antenna(s) 608, the user interface 612, the memory 614, the prediction engine 616, the route manager 618, and/or the calibrator 620 of FIG. 6, and/or based on data, information and/or one or more signal(s) provided by the controller 610 to one or more of the radio transmitter 604, the antenna(s) 608, the user interface 612, the prediction engine 616, the route manager 618, and/or the calibrator 620 of FIG. 6.

The example prediction engine 616 of FIG. 6 implements and/or executes the model developed by the model developer 314 of the server 218 of FIGS. 2 and/or 3. In some examples, the prediction engine 616 makes and/or issues one or more request(s) for the server 218 to transmit the model to the drone 202 of FIGS. 2 and/or 6. In some examples, the prediction engine 616 implements and/or executes the model to identify and/or select favored wireless service areas in real time during flight of the drone 202 based on the location of the drone 202, and without the drone 202 having to consume time and/or processing resources that would otherwise be associated with measuring, obtaining, and/or evaluating reference signal strength data associated with the airspace. The example prediction engine 616 of FIG. 6 includes an example location identifier 622, an example correlation grid identifier 624, an example service area identifier 626, and an example service area selector 628.

Figure 7:
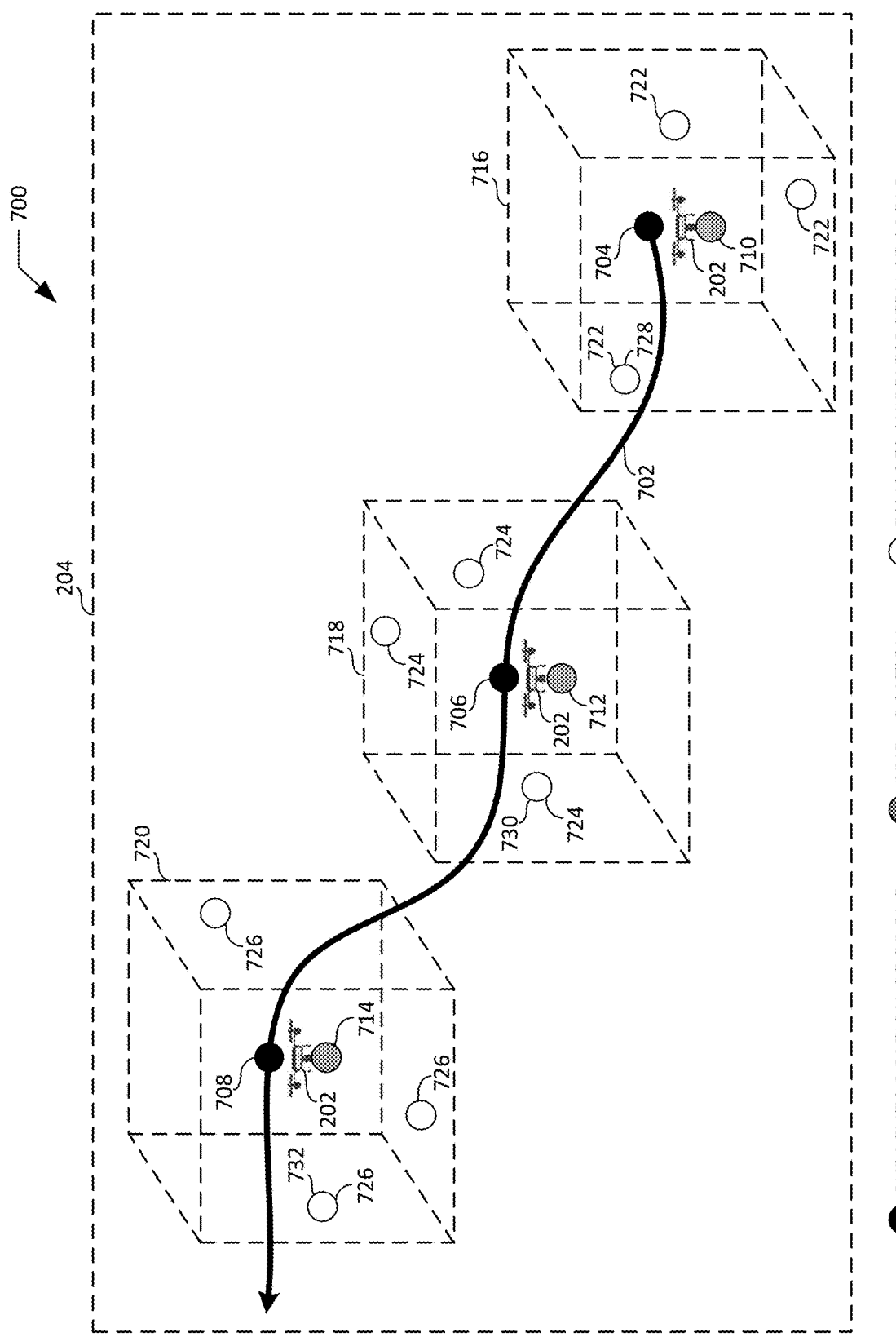
FIG. 7 illustrates an example environment of use in which the example prediction engine of the example drone of FIGS. 2 and/or 6 may implement a model developed by the example model developer of the example server of FIGS. 2 and/or 3 to identify and select favored wireless service areas for an example route of the drone in real time.

FIG. 7 illustrates an example environment of use 700 in which the example prediction engine 616 of the example drone 202 of FIGS. 2 and/or 6 may implement a model developed by the example model developer 314 of the example server 218 of FIGS. 2 and/or 3 to identify and select favored wireless service areas for an example route 702 of the drone 202 in real time during flight, and without the drone 202 having to consume time and/or processing resources that would otherwise be associated with measuring, obtaining, and/or evaluating reference signal strength data associated with the airspace. The environment of use 700 of FIG. 7 includes the airspace 204 of FIG. 2. In the illustrated example of FIG. 7, the drone 202 is shown traveling within the airspace 204 along the route 702 at three different instances in time and/or location relative to the route 702. More specifically, the drone 202 is shown in FIG. 7 at a first example current location 704, a second example current location 706 subsequent in time and/or location to the first current location 704, and a third example current location 708 subsequent in time and/or location to the second current location 706. Respective grid locations (e.g., a first example grid location 710, a second example grid location 712, and a third example grid location 714) associated with corresponding respective ones of the current locations of the drone 202 are also shown in FIG. 7. Respective correlation grids (e.g., a first example correlation grid 716, a second example correlation grid 718, and a third example correlation grid location 720) associated with corresponding respective ones of the grid locations are also shown in FIG. 7. Respective favored wireless service areas (e.g., first example favored wireless service areas 722, second example favored wireless service areas 724, and third example favored wireless service areas 726) associated with corresponding respective ones of the correlation grids are also shown in FIG. 7. The current locations of the drone, the grid locations, the correlation grids, and the favored wireless service areas of FIG. 7 are further described below.

The example location identifier 622 of FIG. 6 identifies a current location of the drone 202 of FIGS. 2 and/or 6. For example, the location identifier 622 may determine a current location of the drone 202 based on the most current location data identified and/or derived from the signal(s) collected and/or received by the GPS receiver 602 of FIG. 6. In the illustrated example of FIG. 7, the location identifier 622 has identified the first current location 704 of the drone 202 at a first instance in time, the second current location 706 of the drone 202 at a second instance in time following the first instance, and the third current location 708 of the drone 202 at a third instance in time following the second instance. In the examples of FIGS. 6 and 7, the location identifier 622 is a means to identify a location of the drone during a flight of the drone. Data corresponding to the current location of the drone 202 identified by the location identifier 622 of FIG. 6 may be of any type, form and/or format, and may be stored in a non-transitory computer-readable storage medium such as the example memory 614 of FIG. 6 described below.

The example correlation grid identifier 624 of FIG. 6 identifies a correlation grid of the model based on the current location of the drone 202 of FIGS. 2 and/or 6. For example, the correlation grid identifier 624 of FIG. 6 may compare the current location of the drone to each grid location of the model to determine and/or identify a grid location that is most proximate to the current location of the drone. Based on the determination and/or identification of the grid location, the correlation gird identifier 624 may identify a correlation grid of the model. For example, the correlation grid identifier 624 may identify a correlation grid having a central node and/or location that is most proximate to the grid location. In the illustrated example of FIG. 7, the correlation grid identifier 624 has identified the first grid location 710 based on the first current location 704 of the drone 202, the second grid location 712 based on the second current location 706 of the drone 202, and the third grid location 714 based on the third current location 708 of the drone 202. The correlation grid identifier 624 has also identified the first correlation grid 716 based on the first grid location 710, the second correlation grid 718 based on the second grid location 712, and the third correlation grid 720 based on the third grid location 714. In the examples of FIGS. 6 and 7, the correlation grid identifier 624 is a means to identify a correlation grid based on the location of the drone. Data corresponding to the grid location and/or the correlation grid identified by the correlation grid identifier 624 of FIG. 6 may be of any type, form and/or format, and may be stored in a non-transitory computer-readable storage medium such as the example memory 614 of FIG. 6 described below.

The example service area identifier 626 of FIG. 6 identifies one or more favored wireless service area(s) associated with the correlation grid identified by the correlation grid identifier 624 of FIG. 6. For example, the service area identifier 626 may identify the favored wireless service area(s) that the model has associated with and/or identified for the specific correlation grid that has been identified by the correlation grid identifier 624. In the illustrated example of FIG. 7, the service area identifier 626 has identified the first favored wireless service areas 722 associated with the first correlation grid 716, the second favored wireless service areas 724 associated with the second correlation grid 718, and the third favored wireless service areas 726 associated with the third correlation grid 720. In the examples of FIGS. 6 and 7, the service area identifier 626 is a means to identify favored wireless service areas during a flight of the drone. Data corresponding to the favored wireless service area(s) identified by the service area identifier 626 of FIG. 6 may be of any type, form and/or format, and may be stored in a non-transitory computer-readable storage medium such as the example memory 614 of FIG. 6 described below.

The example service area selector 628 of FIG. 6 selects one of the one or more favored wireless service area(s) identified by the service area identifier 626 of FIG. 6 and associated with the correlation grid identified by the correlation grid identifier 624 of FIG. 6. For example, the service area selector 628 may select the favored wireless service area that is most proximate to the current location of the drone 202 of FIGS. 2 and/or 6. As another example, the service area selector 628 may select the favored wireless service area that is most proximate to a route of travel of the drone 202, and/or most proximate a destination location associated with the route of travel. In the illustrated example of FIG. 7, the service area selector 628 may select a first example favored wireless service area 728 from among the first favored wireless service areas 722, a second example favored wireless service area 730 from among the second favored wireless service areas 724, and a third example favored wireless service area 732 from among the third favored wireless service areas 726. In the examples of FIGS. 6 and 7, the service area selector 628 is a means to select an identified one of the favored wireless service areas during a flight of the drone. Data corresponding to the favored wireless service area selected by the service area selector 628 of FIG. 6 may be of any type, form and/or format, and may be stored in a non-transitory computer-readable storage medium such as the example memory 614 of FIG. 6 described below.

The example route manager 618 of FIG. 6 generates, manages, and/or controls a route of the drone 202 of FIGS. 2 and/or 6 based on data, information and/or one or more signal(s) obtained and/or accessed by the route manager 618 from one or more of the GPS receiver 602, the radio receiver 606, the antenna(s) 608, the controller 610, the user interface 612, the memory 614, and/or the prediction engine 616 of FIG. 6, and/or based on data, information and/or one or more signal(s) provided by the route manager 618 to one or more of the radio transmitter 604, the antenna(s) 608, the controller 610, the user interface 612, the memory 614, and/or the prediction engine 616 of FIG. 6. In some examples, the route manager 618 generates, manages, and/or controls the route of the drone 202 based on control data received at the drone 202 from the server 218 of FIGS. 2 and/or 3. In some examples, the route manager 618 generates, manages, and/or controls the route of the drone 202 based on the model received at the drone 202 from the server 218 of FIGS. 2 and/or 3.

In some examples, the route manager 618 of FIG. 6 adjusts, changes, and/or alters a position of the drone and/or a route to be followed during a flight of the drone 202 of FIGS. 2 and/or 6 based on the favored wireless service area selected by the service area selector 628 of the prediction engine 616 of FIG. 6. For example, the route manager 618 may instruct and/or command the drone 202 to adjust position, course, and/or direction such that the drone 202 is more proximate to the favored wireless service area selected by the service area selector 628. As another example, the route manager 618 may instruct and/or command the drone 202, or a directional antenna of the drone 202, to adjust (e.g., change) position, course, and/or direction such that the drone 202 and/or a directional communication beam associated with the directional antenna of the drone 202 is/are more proximate to and/or pointed toward the favored wireless service area selected by the serving cell. In the illustrated example of FIG. 7, the route manager 618 may adjust the route 702 of the drone 202 based on the selection of the first favored wireless service area 728, the selection of the second favored wireless service area 730, and/or based on the selection of the third favored wireless service area 732. By adjusting the position and/or route to be followed during the flight of the drone 202 based on the favored wireless service area selected by the service area selector 628, the route manager 618 of FIG. 6 improves the likelihood that the drone 202 will maintain a communication channel with the server 218 of FIGS. 2 and/or 3. In the examples of FIGS. 6 and 7, the route manager 618 is a means to adjust the drone during the flight of the drone based on a selected one of the favored wireless service areas.

In some examples, the route manager 618 may continue adjusting the position and/or route of the drone 202 in real time based on favored wireless service areas as the drone continues to travel along the route towards a destination location. In some examples, the route manager 618 may continue adjusting the position and/or route of the drone 202 in response to repetition of the above-described operations of the location identifier 622, the correlation grid identifier 624, the service area identifier 626, the service area selector 628, and/or, more generally, the prediction engine 616 of FIG. 6 as the drone continues to travel along the route. In some examples, the route manager 618 of FIG. 6 may receive one or more input(s), instruction(s), and/or command(s) via the user interface 612 of FIG. 6 providing an indication as to whether the route manager 618 is to continue adjusting the position and/or route of the drone based on favored wireless service areas.

The example calibrator 620 of FIG. 6 instructs, controls, and/or commands the drone 202 of FIGS. 2 and/or 6 to collect reference signal strength data from a calibration location within an airspace. In some examples, the calibration location may correspond to the current location of the drone 202. In other examples, the calibration location may correspond to a sampling point of a grid (e.g., a correlation grid) of an airspace. The calibrator 620 may compare the reference signal strength data collected from the calibration location to reference signal strength data collected (e.g., collected at an earlier time) from a corresponding sampling location (e.g., a sampling location most proximate to the calibration location) to determine the accuracy of the reference signal strength data collected from the sampling location. Data corresponding to the reference signal strength data collected from the calibration location may be of any type, form and/or format, and may be stored in a non-transitory computer-readable storage medium such as the example memory 614 of FIG. 6 described below.

The example user interface 612 of FIG. 6 facilitates interactions and/or communications between an end user and the drone 202. The user interface 612 includes one or more input device(s) 630 via which the user may input information and/or data to the drone 202. For example, the user interface 612 may be a button, a switch, a microphone, and/or a touchscreen that enable(s) the user to convey data and/or commands to the example controller 610 of FIG. 6 described above, and/or, more generally, to the drone 202 of FIG. 6. The user interface 612 of FIG. 6 also includes one or more output device(s) 632 via which the user interface 612 presents information and/or data in visual and/or audible form to the user. For example, the user interface 612 may include a light emitting diode, a touchscreen, and/or a liquid crystal display for presenting visual information, and/or a speaker for presenting audible information. Data and/or information that is presented and/or received via the user interface 612 may be of any type, form and/or format, and may be stored in a non-transitory computer-readable storage medium such as the example memory 614 of FIG. 6 described below.

The example memory 614 of FIG. 6 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 614 may be stored in any file and/or data structure format, organization scheme, and/or arrangement.

The memory 614 is accessible to one or more of the example GPS receiver 602, the example radio transmitter 604, the example radio receiver 606, the example controller 610 (e.g., including one or more of the example prediction engine 616, the example route manager 618, the example calibrator 620, the example location identifier 622, the example correlation grid identifier 624, the example service area identifier 626, and/or the example service area selector 628), the example user interface 612, and/or, more generally, the drone 202 of FIG. 6.

While an example manner of implementing the drone 202 of FIG. 2 is illustrated in FIG. 6, one or more of the elements, processes and/or devices illustrated in FIG. 6 may be combined, divided, re-arranged, omitted, eliminated and/or implemented in any other way. Further, the example GPS receiver 602, the example radio transmitter 604, the example radio receiver 606, the example antenna(s) 608, the example controller 610, the example user interface 612, the example memory 614, the example prediction engine 616, the example route manager 618, the example calibrator 620, the example location identifier 622, the example correlation grid identifier 624, the example service area identifier 626, and/or the example service area selector 628 of FIG. 6 may be implemented by hardware, software, firmware and/or any combination of hardware, software and/or firmware. Thus, for example, any of the example GPS receiver 602, the example radio transmitter 604, the example radio receiver 606, the example antenna(s) 608, the example controller 610, the example user interface 612, the example memory 614, the example prediction engine 616, the example route manager 618, the example calibrator 620, the example location identifier 622, the example correlation grid identifier 624, the example service area identifier 626, and/or the example service area selector 628 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example GPS receiver 602, the example radio transmitter 604, the example radio receiver 606, the example antenna(s) 608, the example controller 610, the example user interface 612, the example memory 614, the example prediction engine 616, the example route manager 618, the example calibrator 620, the example location identifier 622, the example correlation grid identifier 624, the example service area identifier 626, and/or the example service area selector 628 of FIG. 6 is/are hereby expressly defined to include a non-transitory computer readable storage device or storage disk such as a memory, a digital versatile disk (DVD), a compact disk (CD), a Blu-ray disk, etc. including the software and/or firmware. Further still, the example drone 202 of FIGS. 2 and/or 6 may include one or more elements, processes and/or devices in addition to, or instead of, those illustrated in FIG. 6, and/or may include more than one of any or all of the illustrated elements, processes and devices.

Figure 8:
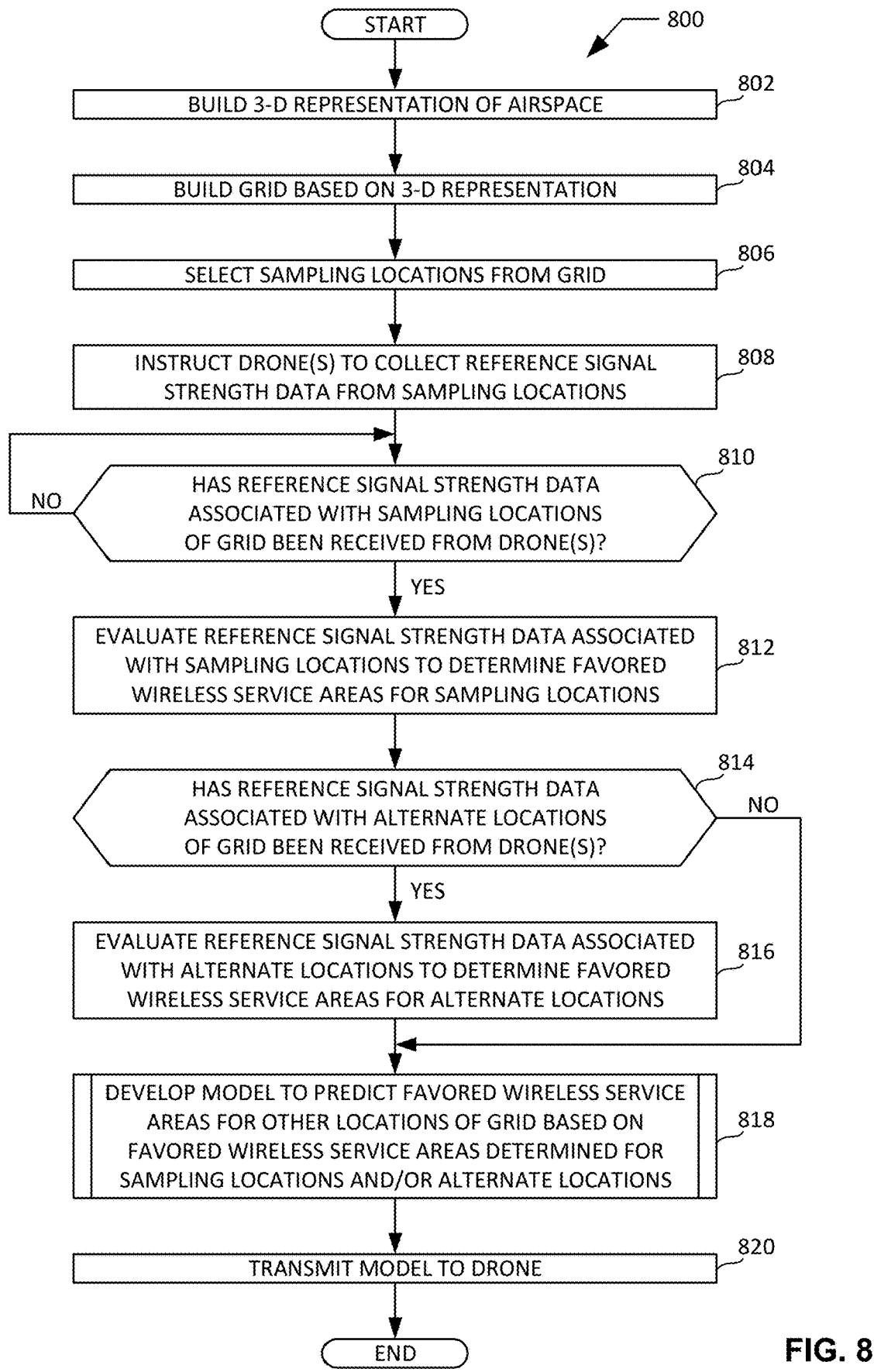
FIG. 8 is a flowchart representative of example machine readable instructions that may be executed at the example server of FIGS. 2 and/or 3 to develop a model to predict favored wireless service areas for a drone.
Figure 9:
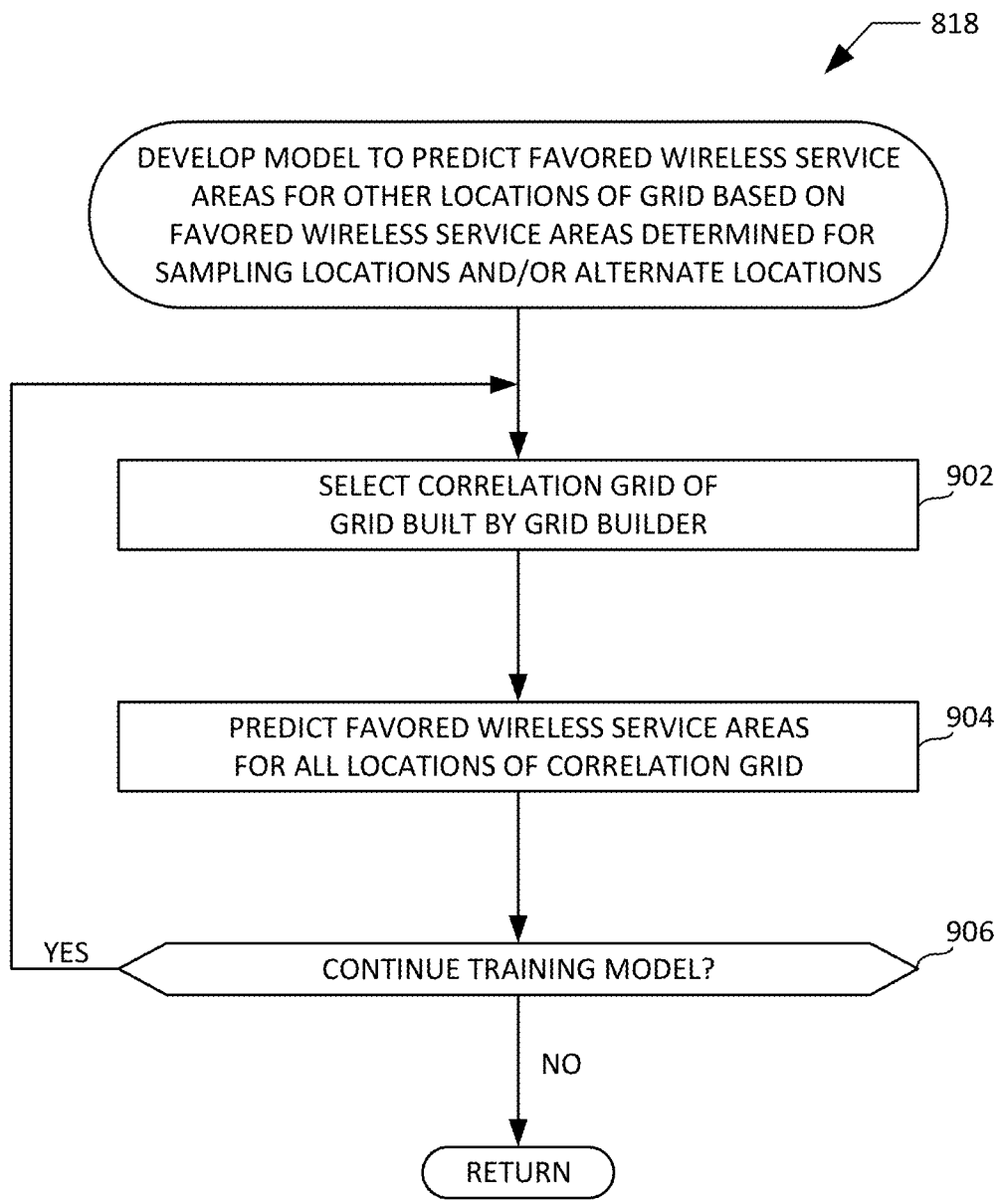
FIG. 9 is a flowchart representative of example machine readable instructions that may be executed at the example server of FIGS. 2 and/or 3 to develop a model using correlation grids to predict favored wireless service areas for a drone.
Figure 10:
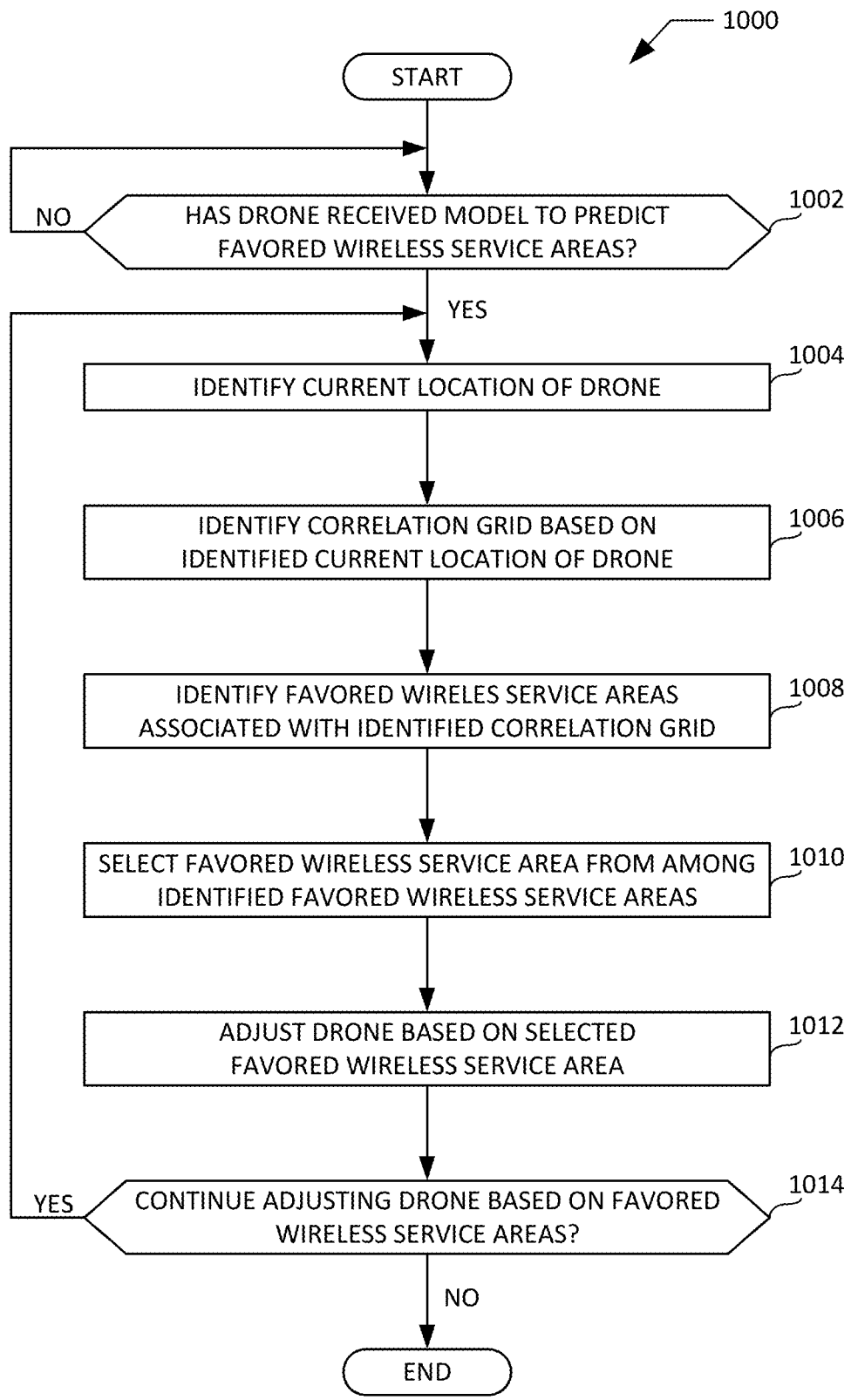
FIG. 10 is a flowchart representative of example machine readable instructions that may be executed at the example drone of FIGS. 2 and/or 6 to adjust the drone based on favored wireless service areas identified and selected in real time during flight of the drone.

Flowcharts representative of example machine readable instructions which may be executed by a processor to implement the server 218 of FIGS. 2 and/or 3 and the drone 202 of FIGS. 2 and/or 6 are shown in FIGS. 8-10. In these examples, the machine readable instructions are one or more program(s) for execution by a processor such as the example processor 306 of FIG. 3 shown in the example processor platform 1100 discussed below in connection with FIG. 11, and/or by the example controller 610 of FIG. 6 shown in the example processor platform 1200 discussed below in connection with FIG. 12. The program(s) may be embodied in software stored on a non-transitory computer readable storage medium such as a CD-ROM, a floppy disk, a hard drive, a digital versatile disk (DVD), a Blu-ray disk, or a memory associated with the processor 306 of FIG. 3 and/or the controller 610 of FIG. 6, but the entire program(s) and/or parts thereof could alternatively be executed by a device other than the processor 306 of FIG. 3 and/or the controller 610 of FIG. 6, and/or embodied in firmware or dedicated hardware. Further, although the example program(s) is/are described with reference to the flowcharts illustrated in FIGS. 8-10, many other methods for implementing the server 218 of FIGS. 2 and/or 3 and the drone 202 of FIGS. 2 and/or 6 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated Circuit (ASIC), a comparator, an operational-amplifier (op-amp), a logic circuit, etc.) structured to perform the corresponding operation without executing software or firmware.

As mentioned above, the example processes of FIGS. 8-10 may be implemented using coded instructions (e.g., computer and/or machine readable instructions) stored on a non-transitory computer and/or machine readable medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "non-transitory computer readable storage medium" is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the terms "comprising" and "including" are open ended.

FIG. 8 is a flowchart representative of example machine readable instructions 800 that may be executed at the example server 218 of FIGS. 2 and/or 3 to develop a model to predict favored wireless service areas for a drone. The example program 800 begins when the example grid builder 316 of the example server 218 of FIGS. 2 and/or 3 builds a three-dimensional representation of an airspace (block 802). For example, the grid builder 316 may build the example three-dimensional representation 222 of FIG. 2 or the example three-dimensional representation 400 of FIG. 4. Following block 802, control proceeds to block 804.

At block 804, the example grid builder 316 of the example server 218 of FIGS. 2 and/or 3 builds a grid based on the three-dimensional representation (block 804). For example, the grid builder 316 may build the example grid 224 of FIG. 2 based on the example three-dimensional representation 222 of FIG. 2, or may build the example grid 402 based on the example three-dimensional representation 400 of FIG. 4. Following block 804, control proceeds to block 806.

At block 806, the example sampling location selector 318 of the example server 218 of FIGS. 2 and/or 3 selects sampling locations from the grid (block 806). For example, the sampling location selector 318 may select the example sampling locations 226 from the example grid 224 of FIG. 2, or may select the example sampling locations 404 from the example grid 402 of FIG. 4. Following block 806, control proceeds to block 808.

At block 808, the example sampler 320 of the example server 218 of FIGS. 2 and/or 3 instructs and/or commands one or more drone(s) to collect reference signal strength data from the sampling locations (block 808). For example, the sampler 320 may instruct one or more drone(s) to collect reference signal strength data from the example sampling locations 226 of the example grid 224 of FIG. 2, or may instruct one or more drone(s) to collect reference signal strength data from the example sampling locations 404 of the example grid 402 of FIG. 4. Following block 808, control proceeds to block 810.

At block 810, the example evaluator 322 of the example server 218 of FIGS. 2 and/or 3 determines whether reference signal strength data associated with the sampling locations of the grid has been received at the server 218 of FIGS. 2 and/or 3 (block 810). For example, the evaluator 322 may determine whether reference signal strength data associated with the example sampling locations 226 of the example grid 224 of FIG. 2 has been received via the example radio receiver 304 of the server 218 of FIGS. 2 and/or 3, or may determine whether reference signal strength data associated with the example sampling locations 404 of the example grid 402 of FIG. 4 has been received via the example radio receiver 304 of the server 218 of FIGS. 2 and/or 3. If the evaluator 322 determines at block 810 that reference signal strength data associated with the sampling locations of the grid has been received at the server 218, control proceeds to block 812. If the evaluator 322 instead determines at block 810 that reference signal strength data associated with the sampling locations of the grid has not been received at the server 218, control remains at block 810.

At block 812, the example evaluator 322 of the example server 218 of FIGS. 2 and/or 3 evaluates the reference signal strength data associated with the sampling locations of the grid to determine favored wireless service areas for the sampling locations (block 812). For example, the evaluator 322 may evaluate the reference signal strength data associated with the example sampling locations 226 of the example grid 224 of FIG. 2, or may evaluate the reference signal strength data associated with the example sampling locations 404 of the example grid 402 of FIG. 4. Following block 812, control proceeds to block 814.

At block 814, the example evaluator 322 of the example server 218 of FIGS. 2 and/or 3 determines whether reference signal strength data associated with alternate locations of the grid has been received at the server 218 of FIGS. 2 and/or 3 (block 814). For example, the evaluator 322 may determine whether reference signal strength data associated with the example alternate locations 228 of the example grid 224 of FIG. 2 has been received via the example radio receiver 304 of the server 218 of FIGS. 2 and/or 3, or may determine whether reference signal strength data associated with the example alternate locations 406 of the example grid 402 of FIG. 4 has been received via the example radio receiver 304 of the server 218 of FIGS. 2 and/or 3. If the evaluator 322 determines at block 814 that reference signal strength data associated with alternate locations of the grid has been received at the server 218, control proceeds to block 816. If the evaluator 322 instead determines at block 814 that reference signal strength data associated with alternate locations of the grid has not been received at the server 218, control proceeds to block 818.

At block 816, the example evaluator 322 of the example server 218 of FIGS. 2 and/or 3 evaluates the reference signal strength data associated with the alternate locations of the grid to determine favored wireless service areas for the alternate locations (block 816). For example, the evaluator 322 may evaluate the reference signal strength data associated with the example alternate locations 228 of the example grid 224 of FIG. 2, or may evaluate the reference signal strength data associated with the example alternate locations 406 of the example grid 402 of FIG. 4. Following block 816, control proceeds to block 818.

At block 818, the example model developer 314 of the example server 218 of FIGS. 2 and/or 3 develops a model to predict favored wireless service areas for other locations of the grid based on the favored wireless service areas determined for the sampling locations and/or the alternate locations (block 818). For example, the model developer 314 may develop a model to predict favored wireless service areas for other locations of the grid based on the favored wireless service areas determined for the example sampling locations 226 and/or the example alternate locations 228 of the example grid 224 of FIG. 2, or based on the favored wireless service areas determined for the example sampling locations 404 and/or the example alternate locations 406 of the example grid 402 of FIG. 2. An example process that may be used to implement block 818 of the example program 800 of FIG. 8 is described in greater detail below in connection with FIG. 9. Following block 818, control proceeds to block 820.

At block 820, the example radio transmitter 302 of the example server 218 of FIGS. 2 and/or 3 transmits the model to a drone (block 820). For example, the radio transmitter 302 may transmit the model to the example drone 202 of FIGS. 2 and/or 6. In some examples, the radio transmitter 302 may transmit the model to the drone in response to a request for the model received at the example server 218 of FIGS. 2 and/or 3 from the drone. Following block 820, the example program 800 of FIG. 8 ends.

FIG. 9 is a flowchart representative of example machine readable instructions 818 that may be executed at the example server 218 of FIGS. 2 and/or 3 to develop a model using correlation grids to predict favored wireless service areas for a drone. Example operations of blocks 902, 904 and 906 of FIG. 9 may be used to implement block 818 of FIG. 8. The example program 818 begins when the example correlation grid selector 324 of the example server 218 of FIGS. 2 and/or 3 selects a correlation grid of a grid built by the example grid builder 316 of the example server 218 of FIGS. 2 and/or 3. For example, the correlation grid selector 324 may select (e.g., randomly or pseudo-randomly select) a correlation grid of the example grid 224 of FIG. 2, or a correlation grid of the example grid 402 of FIG. 4 (block 902). Following block 902, control proceeds to block 904.

At block 904, the example correlation grid evaluator 326 of the example server 218 of FIGS. 2 and/or 3 predicts favored wireless service areas for all of the locations of the correlation grid selected by the example correlation grid selector 324 of the example server 218 of FIGS. 2 and/or 3 (block 904). For example, the correlation grid evaluator 326 may develop a joint distribution with adjustable parameters to model the relationship between the grid locations (e.g., all of the grid locations) of the correlation grid selected by the correlation grid selector 324 of FIG. 3. In some examples, the correlation grid evaluator 326 may develop the joint distribution by implementing and/or executing a conditional random field (CRF) process that may be expressed and/or defined according to Equations 1-4 described above. Following block 904, control proceeds to block 906.

At block 906, the example model developer 314 of FIG. 3 determines whether to continue training the model (block 906). For example, the model developer 314 may receive one or more input(s), instruction(s), and/or command(s) via the example user interface 308 of FIG. 3 providing an indication as to whether the model developer 314 is to continue training the model. If the model developer 314 determines at block 906 to continue training the model, control returns to block 902. If the model developer instead determines at block 906 not to continue training the model, control of the example program 818 of FIG. 9 returns to a function call such as block 818 of the example program 800 of FIG. 8.

FIG. 10 is a flowchart representative of example machine readable instructions 1000 that may be executed at the example drone 202 of FIGS. 2 and/or 6 to adjust the drone 202 based on favored wireless service areas identified and selected in real time during flight of the drone 202. The example program 1000 begins when the example prediction engine 616 of the example drone 202 of FIGS. 2 and/or 6 determines whether the drone 202 has received a model to predict favored wireless service areas for the drone 202 (block 1002). For example, the prediction engine 616 may determine that the drone 202 has received, via the example radio receiver 606 of the drone 202, a model developed by the example model developer 314 of the example server 218 of FIGS. 2 and/or 3. If the prediction engine 616 determines at block 1002 that the drone 202 has received a model to predict favored wireless service areas for the drone 202, control proceeds to block 1004. If the prediction engine 616 instead determines at block 1002 that the drone 202 has not received a model to predict favored wireless service areas for the drone 202, control remains at block 1002.

At block 1004, the example location identifier 622 of the example drone 202 of FIGS. 2 and/or 6 identifies a current location of the drone 202 (block 1004). For example, the location identifier 622 may identify the first example current location 704 of the drone 202 shown in FIG. 7. Following block 1004, control proceeds to block 1006.

At block 1006, the example correlation grid identifier 624 of the example drone 202 of FIGS. 2 and/or 6 identifies a correlation grid based on the identified current location of the drone 202 (block 1006). For example, the correlation grid identifier 624 may identify the first example correlation grid 716 shown in FIG. 7 based on the first example current location 704 of the drone 202 shown in FIG. 7, and further based on the first example grid location 710 shown in FIG. 7. Following block 1006, control proceeds to block 1008.

At block 1008, the example service area identifier 626 of the example drone 202 of FIGS. 2 and/or 6 identifies favored wireless service areas associated with the identified correlation grid (block 1008). For example, the service area identifier 626 may identify the first example favored wireless service areas 722 of FIG. 7 associated with the first example correlation grid 716 shown in FIG. 7. Following block 1008, control proceeds to block 1010.

At block 1010, the example service area selector 628 of the example drone 202 of FIGS. 2 and/or 6 selects a favored wireless service area from among the identified favored wireless service areas (block 1010). For example, the service area selector 628 may identify the first example favored wireless service area 728 from among the first example favored wireless service areas 722 of FIG. 7. Following block 1010, control proceeds to block 1012.

At block 1012, the example route manager 618 of the example drone 202 of FIGS. 2 and/or 6 adjusts the drone 202 (e.g., adjusts a position and/or a route of the drone) based on the selected favored wireless service area (block 1012). For example, the route manager 618 may adjust the example route 702 of the drone 202 shown in FIG. 7 based on the selection of the first example favored wireless service area 728 of FIG. 7. Following block 1012, control proceeds to block 1014.

At block 1014, the example route manager 618 of the example drone 202 of FIGS. 2 and/or 6 determines whether to continue adjusting the drone based on favored wireless service areas (block 1014). For example, the route manager 618 may receive one or more input(s), instruction(s), and/or command(s) via the example user interface 612 of FIG. 6 providing an indication as to whether the route manager 618 is to continue adjusting the drone 202 based on favored wireless service areas. If the route manager 618 determines at block 1014 to continue adjusting the drone 202 based on favored wireless service areas, control returns to block 1004. If the route manager 618 instead determines at block 1014 not to continue adjusting the drone 202 based on favored wireless service areas, the example program 1000 of FIG. 10 ends.

Figure 11:
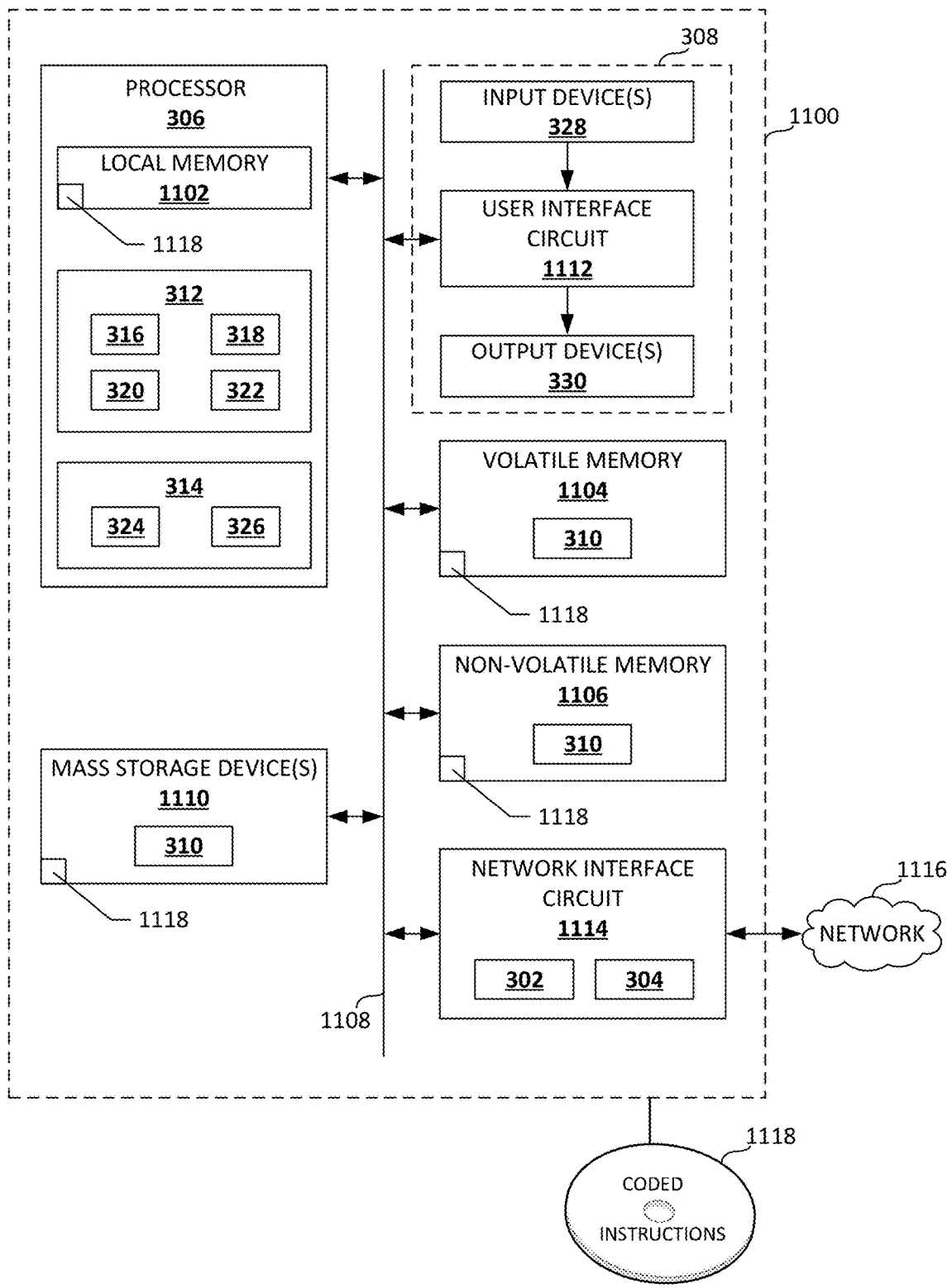
FIG. 11 is a block diagram of an example processor platform structured to execute the instructions of FIGS. 8 and 9 to implement the example server of FIGS. 2 and/or 3.

FIG. 11 is a block diagram of an example processor platform 1100 structured to execute the instructions 800 of FIGS. 8 and 9 to implement the example server 218 of FIGS. 2 and/or 3. The processor platform 1100 of the illustrated example includes a processor implemented as the example processor 306 of FIG. 3. The processor 306 of the illustrated example is hardware. For example, the processor 306 can be implemented by one or more integrated circuit(s), logic circuit(s), microprocessor(s), or controller(s) from any desired family or manufacturer. The hardware processor may be a semiconductor based (e.g., silicon based) device. The processor 306 of the illustrated example implements the example database builder 312, the example model developer 314, the example grid builder 316, the example sampling location selector 318, the example sampler 320, the example evaluator 322, the example correlation grid selector 324, and/or the example correlation grid evaluator 326 of FIG. 3.

The processor 306 of the illustrated example includes a local memory 1102 (e.g., a cache). The processor 306 of the illustrated example is in communication with a main memory including a volatile memory 1104 and a non-volatile memory 1106 via a bus 1108. The volatile memory 1104 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1106 may be implemented by flash memory and/or any other desired type of memory device. Access to the main memory 1104, 1106 is controlled by a memory controller. In the illustrated example of FIG. 11, one or both of the volatile memory 1104 and/or the non-volatile memory 1106 implement(s) the example memory 310 of FIG. 3.

The processor platform 1100 of the illustrated example also includes one or more mass storage device(s) 1110 for storing software and/or data. Examples of such mass storage devices 1110 include floppy disk drives, hard drive disks, compact disk drives, Blu-ray disk drives, RAID systems, and digital versatile disk (DVD) drives. In the illustrated example of FIG. 11, the mass storage device(s) implement(s) the example memory 310 of FIG. 3.

The processor platform 1100 of the illustrated example also includes a user interface circuit 1112. The user interface circuit 1112 may be implemented by any type of interface standard, such as an Ethernet interface, a universal serial bus (USB), and/or a PCI express interface. In the illustrated example, one or more input device(s) 328 are connected to the user interface circuit 1112. The input device(s) 328 permit(s) a user to enter data and commands into the processor 306. The input device(s) 328 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 330 are also connected to the user interface circuit 1112 of the illustrated example. The output device(s) 330 can be implemented, for example, by a light emitting diode, an organic light emitting diode, a liquid crystal display, a touchscreen and/or a speaker. The user interface circuit 1112 of the illustrated example may, thus, include a graphics driver such as a graphics driver chip and/or a processor. In the illustrated example, the input device(s) 328, the output device(s) 330, and the user interface circuit 1112 collectively implement the example user interface 308 of FIG. 3.

The processor platform 1100 of the illustrated example also includes a network interface circuit 1114. The network interface circuit 1114 may be implemented by any type of interface standard, such as an Ethernet interface, a universal serial bus (USB), and/or a PCI express interface. In the illustrated example, the network interface circuit 1114 includes the example radio transmitter 302 and the example radio receiver 304 of FIG. 3 to facilitate the exchange of data and/or signals with external machines (e.g., the drone 202 of FIGS. 2 and/or 3, other drones, etc.) via a network 1116 (e.g., a cellular network, a wireless local area network (WLAN), etc.).

Coded instructions 1118 including the coded instructions 800 of FIGS. 8 and 9 may be stored in the local memory 1102, in the volatile memory 1104, in the non-volatile memory 1106, in the mass storage device(s) 1110, and/or on a removable tangible computer readable storage medium such as a flash memory stick, a CD, or a DVD.

Figure 12:
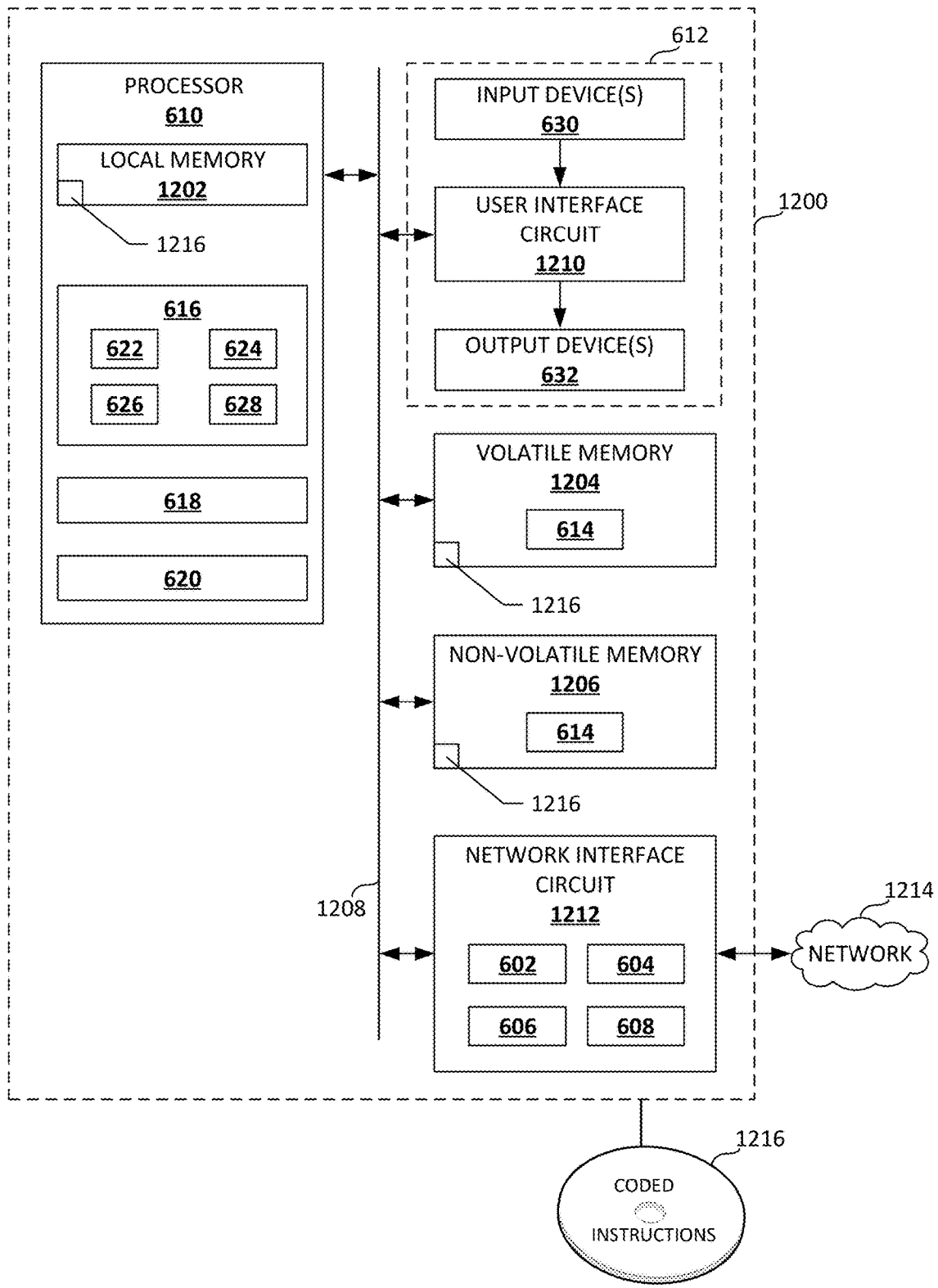
FIG. 12 is a block diagram of an example processor platform structured to execute the instructions of FIG. 10 to implement the example drone of FIGS. 2 and/or 6.

FIG. 12 is a block diagram of an example processor platform 1200 structured to execute the instructions 1000 of FIG. 10 to implement the example drone 202 of FIGS. 2 and/or 6. The processor platform 1200 of the illustrated example includes a processor implemented as the example controller 610 of FIG. 6. The controller 610 of the illustrated example is hardware. For example, the controller 610 can be implemented by one or more integrated circuit(s), logic circuit(s) or microprocessor(s) from any desired family or manufacturer. The hardware controller may be a semiconductor based (e.g., silicon based) device. The controller 610 of the illustrated example implements the example prediction engine 616, the example route manager 618, the example calibrator 620, the example location identifier 622, the example correlation grid identifier 624, the example service area identifier 626, and the example service area selector 628 of FIG. 6.

The controller 610 of the illustrated example includes a local memory 1202 (e.g., a cache). The controller 610 of the illustrated example is in communication with a main memory including a volatile memory 1204 and a non-volatile memory 1206 via a bus 1208. The volatile memory 1204 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1206 may be implemented by flash memory and/or any other desired type of memory device. Access to the main memory 1204, 1206 is controlled by a memory controller. In the illustrated example of FIG. 12, one or both of the volatile memory 1204 and/or the non-volatile memory 1206 implement(s) the example memory 614 of FIG. 6.

The processor platform 1200 of the illustrated example also includes a user interface circuit 1210. The user interface circuit 1210 may be implemented by any type of interface standard, such as an Ethernet interface, a universal serial bus (USB), and/or a PCI express interface. In the illustrated example, one or more input device(s) 630 are connected to the user interface circuit 1210. The input device(s) 630 permit(s) a user to enter data and commands into the controller 610. The input device(s) 630 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 632 are also connected to the user interface circuit 1210 of the illustrated example. The output device(s) 632 can be implemented, for example, by a light emitting diode, an organic light emitting diode, a liquid crystal display, a touchscreen and/or a speaker. The user interface circuit 1210 of the illustrated example may, thus, include a graphics driver such as a graphics driver chip and/or processor. In the illustrated example, the input device(s) 630, the output device(s) 632, and the user interface circuit 1210 collectively implement the example user interface 612 of FIG. 6.

The processor platform 1200 of the illustrated example also includes a network interface circuit 1212. The network interface circuit 1212 may be implemented by any type of interface standard, such as an Ethernet interface, a universal serial bus (USB), and/or a PCI express interface. In the illustrated example, the network interface circuit 1212 includes the example GPS receiver 602, the example radio transmitter 604, the example radio receiver 606, and the example antenna(s) 608 of FIG. 6 to facilitate the exchange of data and/or signals with external machines (e.g., the server 218 of FIGS. 2 and/or 3, etc.) via a network 1214 (e.g., a cellular network, a wireless local area network (WLAN), etc.).

Coded instructions 1218 including the coded instructions 1000 of FIG. 10 may be stored in the local memory 1202, in the volatile memory 1204, in the non-volatile memory 1206, and/or on a removable tangible computer readable storage medium such as a flash memory stick, a CD, or a DVD.

From the foregoing, it will be appreciated that methods and apparatus have been disclosed for predicting favored wireless service areas for drones. The disclosed methods and apparatus implement a model (e.g., a model developed offline by a server) to predict favored wireless service areas for a drone traveling, or expected to be traveling, within an airspace. The model may be transmitted and/or uploaded to the drone prior to the drone entering the airspace or, alternatively, while the drone is traveling within the airspace. The drone advantageously utilizes the favored wireless service areas identified by the model to make, and/or to determine the need for, adjustments to the drone (e.g., adjustments to a position and/or a route of the drone) in real time during a flight of the drone, and without the drone having to consume time and/or processing resources that would otherwise be associated with measuring, obtaining, and/or evaluating reference signal strength data associated with the airspace in real time during flight.

In some examples, a controller for a drone is disclosed. In some disclosed examples, the controller includes a service area identifier to identify favored wireless service areas during a flight of the drone. In some disclosed examples, the favored wireless service areas are predicted by a model developed remotely from the drone. In some disclosed examples, the controller further includes a service area selector to select one of the favored wireless service areas during the flight. In some disclosed examples, the controller further includes a route manager to adjust a flight path of the drone during the flight based on the selected one of the favored wireless service areas.

In some disclosed examples, the controller further includes a location identifier to identify a location of the drone during the flight. In some disclosed examples, the controller further includes a correlation grid identifier to identify a correlation grid based on the location of the drone. In some disclosed examples, the favored wireless service areas are associated with the correlation grid.

In some disclosed examples, the drone is to receive the model from a server in response to a request issued by the drone.

In some disclosed examples, the route manager is to adjust the flight path of the drone by instructing the drone to move toward the selected one of the favored wireless service areas. In some disclosed examples, the route manager is to adjust the drone by instructing the drone to move a directional communication beam of a directional antenna of the drone toward the selected one of the favored wireless service areas.

In some disclosed examples, the favored wireless service areas are predicted by the model remotely from the drone based on reference signal strength data obtained from sampling locations associated with a grid prior to the flight of the drone. In some disclosed examples, the grid is based on a three-dimensional representation of an airspace. In some disclosed examples, the favored wireless service areas are predicted by the model remotely from the drone based on a conditional random field process applied to a correlation grid selected from the grid.

In some disclosed examples, the service area identifier is to identify the favored wireless service areas without the drone measuring reference signal strength data during the flight of the drone.

In some examples, a non-transitory computer readable storage medium comprising instructions is disclosed. In some disclosed examples, the instructions, when executed, cause one or more processors of a drone to identify favored wireless service areas during a flight of the drone. In some disclosed examples, the favored wireless service areas are based on a model developed by a server remote from the drone. In some disclosed examples, the instructions, when executed, cause the one or more processors of the drone to select one of the favored wireless service areas during the flight. In some disclosed examples, the instructions, when executed, cause the one or more processors of the drone to adjust a direction of the drone during the flight based on the selected one of the favored wireless service areas.

In some disclosed examples, the instructions, when executed, cause the one or more processors of the drone to identify a location of the drone during the flight. In some disclosed examples, the instructions, when executed, cause the one or more processors of the drone to identify a correlation grid based on the location of the drone. In some disclosed examples, the favored wireless service areas are associated with the correlation grid.

In some disclosed examples, the instructions, when executed, cause the one or more processors of the drone to issue a request for the model. In some disclosed examples, the drone is to receive the model from the server in response to the request.

In some disclosed examples, the instructions, when executed, cause the one or more processors of the drone to adjust the direction of the drone by instructing the drone to move toward the selected one of the favored wireless service areas. In some disclosed examples, the instructions, when executed, cause the one or more processors of the drone to adjust the direction of the drone by instructing the drone to move a directional communication beam of a directional antenna of the drone toward the selected one of the favored wireless service areas.

In some disclosed examples, the favored wireless service areas are predicted by the model remotely from the drone based on reference signal strength data obtained from sampling locations associated with a grid. In some disclosed examples, the grid is based on a three-dimensional representation of an airspace. In some disclosed examples, the favored wireless service areas are predicted by the model remotely from the drone based on a conditional random field process applied to a correlation grid selected from the grid.

In some disclosed examples, the favored wireless service areas are identified without the drone measuring reference signal strength data during the flight of the drone.

In some examples, a method is disclosed. In some disclosed examples, the method includes identifying, by executing a computer readable instruction with one or more processors of a drone, favored wireless service areas during a flight of the drone. In some disclosed examples, the favored wireless service areas are predicted by a model provided to the drone via a network communication. In some disclosed examples, the method further includes selecting, by executing a computer readable instruction with the one or more processors, one of the favored wireless service areas during the flight based on the model. In some disclosed examples, the method further includes adjusting, by executing a computer readable instruction with the one or more processors, an operation of the drone during the flight based on the selected one of the favored wireless service areas.

In some disclosed examples, the identifying the favored wireless service areas includes identifying a location of the drone during the flight. In some disclosed examples, the wherein the identifying the favored wireless service areas includes identifying a correlation grid based on the location of the drone.

In some disclosed examples, the method further includes receiving the model from a server in response to a request issued by the drone.

In some disclosed examples, the adjusting the operation of the drone includes instructing the drone to move toward the selected one of the favored wireless service areas. In some disclosed examples, the adjusting the operation of the drone includes instructing the drone to move a directional communication beam of a directional antenna of the drone toward the selected one of the favored wireless service areas.

In some examples, a controller for a drone is disclosed. In some disclosed examples, the controller includes service area identifying means to identify favored wireless service areas during a flight of the drone. In some disclosed examples, the favored wireless service areas are predicted by a model developed remotely from the drone. In some disclosed examples, the controller further includes service area selecting means to select one of the favored wireless service areas during the flight. In some disclosed examples, the controller further includes route managing means to adjust the drone during the flight based on the selected one of the favored wireless service areas.

In some disclosed examples, the controller further includes location identifying means to identify a location of the drone during the flight. In some disclosed examples, the controller further includes correlation grid identifying means to identify a correlation grid based on the location of the drone.

In some disclosed examples, the route managing means is to adjust the drone by instructing the drone to move toward the selected one of the favored wireless service areas. In some disclosed examples, the route managing means is to adjust the drone by instructing the drone to move a directional communication beam of a directional antenna of the drone toward the selected one of the favored wireless service areas.

In some examples, a server is disclosed. In some disclosed examples, the server comprises a database builder to build a database of favored wireless service areas based on reference signal strength data sampled from a subset of grid locations from among a plurality of grid locations of a grid corresponding to an airspace. In some disclosed examples, the server further comprises a model developer to develop a model to predict favored wireless service areas for the plurality of grid locations based on the database. In some disclosed examples, the server further comprises a transmitter to transmit the model to a drone. In some disclosed examples, the model is to be executed at the drone to identify favored wireless service areas during a flight of the drone.

In some disclosed examples, the transmitter is to transmit the model to the drone in response to a request received at the server from the drone. In some disclosed examples, the model enables the drone to identify the favored wireless service areas without the drone measuring reference signal strength data during the flight of the drone.

In some disclosed examples, the server further includes a grid builder to build the grid based on a three-dimensional representation of the airspace. In some disclosed examples, the server further includes a sampling location selector to select the subset of grid locations. In some disclosed examples, the server further includes a sampler to instruct one or more drones to collect the reference signal strength data from the subset of grid locations. In some disclosed examples, the server further includes an evaluator to determine the favored wireless service areas for the subset of grid locations based on the reference signal strength data.

In some disclosed examples, the server further includes a correlation grid selector to select a correlation grid from the grid. In some disclosed examples, the correlation grid has correlation grid locations associated with the grid. In some disclosed examples, the server further includes a correlation grid evaluator to predict favored wireless service areas for the correlation grid locations.

In some examples, a non-transitory computer readable storage medium comprising instructions is disclosed. In some disclosed examples, the instructions, when executed, cause one or more processors of a server to build a database of favored wireless service areas based on reference signal strength data sampled from a subset of grid locations from among a plurality of grid locations of a grid corresponding to an airspace. In some disclosed examples, the instructions, when executed, cause the one or more processors of the server to develop a model to predict favored wireless service areas for the plurality of grid locations based on the database. In some disclosed examples, the instructions, when executed, cause the one or more processors of the server to transmit the model to a drone. In some disclosed examples, the model is to be executed at the drone to identify favored wireless service areas during a flight of the drone.

In some disclosed examples, the instructions, when executed, cause the one or more processors of the server to transmit the model to the drone in response to a request received at the server from the drone. In some disclosed examples, the instructions, when executed, cause the one or more processors of the server to identify the favored wireless service areas without the drone measuring reference signal strength data during the flight of the drone.

In some disclosed examples, the instructions, when executed, cause the one or more processors of the server to build the grid based on a three-dimensional representation of the airspace. In some disclosed examples, the instructions, when executed, cause the one or more processors of the server to select the subset of grid locations. In some disclosed examples, the instructions, when executed, cause the one or more processors of the server to instruct one or more drones to collect the reference signal strength data from the subset of grid locations. In some disclosed examples, the instructions, when executed, cause the one or more processors of the server to determine the favored wireless service areas for the subset of grid locations based on the reference signal strength data.

In some disclosed examples, the instructions, when executed, cause the one or more processors of the server to select a correlation grid from the grid. In some disclosed examples, the correlation grid has correlation grid locations associated with the grid. In some disclosed examples, the instructions, when executed, cause the one or more processors of the server to predict favored wireless service areas for the correlation grid locations.

In some examples, a server is disclosed. In some disclosed examples, the server comprises database building means to build a database of favored wireless service areas based on reference signal strength data sampled from a subset of grid locations from among a plurality of grid locations of a grid corresponding to an airspace. In some disclosed examples, the server further comprises model developing means to develop a model to predict favored wireless service areas for the plurality of grid locations based on the database. In some disclosed examples, the server further comprises transmitting means to transmit the model to a drone. In some disclosed examples, the model is to be executed at the drone to identify favored wireless service areas during a flight of the drone.

In some disclosed examples, the transmitting means is to transmit the model to the drone in response to a request received at the server from the drone. In some disclosed examples, the model enables the drone to identify the favored wireless service areas without the drone measuring reference signal strength data during the flight of the drone.

In some disclosed examples, the server further includes grid building means to build the grid based on a three-dimensional representation of the airspace. In some disclosed examples, the server further includes sampling location selecting means to select the subset of grid locations. In some disclosed examples, the server further includes sampling means to instruct one or more drones to collect the reference signal strength data from the subset of grid locations. In some disclosed examples, the server further includes evaluating means to determine the favored wireless service areas for the subset of grid locations based on the reference signal strength data.

In some disclosed examples, the server further includes correlation grid selecting means to select a correlation grid from the grid. In some disclosed examples, the correlation grid has correlation grid locations associated with the grid. In some disclosed examples, the server further includes correlation grid evaluating means to predict favored wireless service areas for the correlation grid locations.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A controller for a drone, the controller comprising:
   a service area identifier to identify favored wireless service areas during a flight of the drone, the favored wireless service areas being predicted by a model developed remotely from the drone;
   a service area selector to select one of the favored wireless service areas during the flight; and
   a route manager to adjust a flight path of the drone during the flight based on the selected one of the favored wireless service areas.

2. A controller as defined in claim 1, further including a location identifier to identify a location of the drone during the flight.

3. A controller as defined in claim 2, further including a correlation grid identifier to identify a correlation grid based on the location of the drone.

4. A controller as defined in claim 3, wherein the favored wireless service areas are associated with the correlation grid.

5. A controller as defined in claim 1, wherein the drone is to receive the model from a server in response to a request issued by the drone.

6. A controller as defined in claim 1, wherein the route manager is to adjust the flight path of the drone by instructing the drone to move toward the selected one of the favored wireless service areas.

7. A controller as defined in claim 1, wherein the route manager is to adjust the drone by instructing the drone to move a directional communication beam of a directional antenna of the drone toward the selected one of the favored wireless service areas.

8. A controller as defined in claim 1, wherein the favored wireless service areas are predicted by the model remotely from the drone based on reference signal strength data obtained from sampling locations associated with a grid prior to the flight of the drone, the grid being based on a three-dimensional representation of an airspace.

9. A controller as defined in claim 8, wherein the favored wireless service areas are predicted by the model remotely from the drone based on a conditional random field process applied to a correlation grid selected from the grid.

10. A controller as defined in claim 1, wherein the service area identifier is to identify the favored wireless service areas without the drone measuring reference signal strength data during the flight of the drone.

11. A non-transitory computer readable storage medium comprising instructions that, when executed, cause one or more processors of a drone to at least:
    identify favored wireless service areas during a flight of the drone, the favored wireless service areas based on a model developed by a server remote from the drone;
    select one of the favored wireless service areas during the flight; and
    adjust a direction of the drone during the flight based on the selected one of the favored wireless service areas.

12. A non-transitory computer readable storage medium as defined in claim 11, wherein the instructions, when executed, further cause the one or more processors of the drone to identify a location of the drone during the flight.

13. A non-transitory computer readable storage medium as defined in claim 12, wherein the instructions, when executed, further cause the one or more processors of the drone to identify a correlation grid based on the location of the drone.

14. A non-transitory computer readable storage medium as defined in claim 13, wherein the favored wireless service areas are associated with the correlation grid.

15. A non-transitory computer readable storage medium as defined in claim 11, wherein the favored wireless service areas are predicted by the model remotely from the drone based on reference signal strength data obtained from sampling locations associated with a grid, the grid being based on a three-dimensional representation of an airspace.

16. A non-transitory computer readable storage medium as defined in claim 15, wherein the favored wireless service areas are predicted by the model remotely from the drone based on a conditional random field process applied to a correlation grid selected from the grid.

17. A method, comprising:
   identifying, by executing a computer readable instruction with one or more processors of a drone, favored wireless service areas during a flight of the drone, the favored wireless service areas being predicted by a model provided to the drone via a network communication;
   selecting, by executing a computer readable instruction with the one or more processors, one of the favored wireless service areas during the flight based on the model; and
   adjusting, by executing a computer readable instruction with the one or more processors, an operation of the drone during the flight based on the selected one of the favored wireless service areas.

18. A method as defined in claim 17, wherein the identifying the favored wireless service areas includes identifying a location of the drone during the flight.

19. A method as defined in claim 18, wherein the identifying the favored wireless service areas includes identifying a correlation grid based on the location of the drone.

20. A method as defined in claim 17, further including receiving the model from a server in response to a request issued by the drone.

* * * * *